Figure 1:
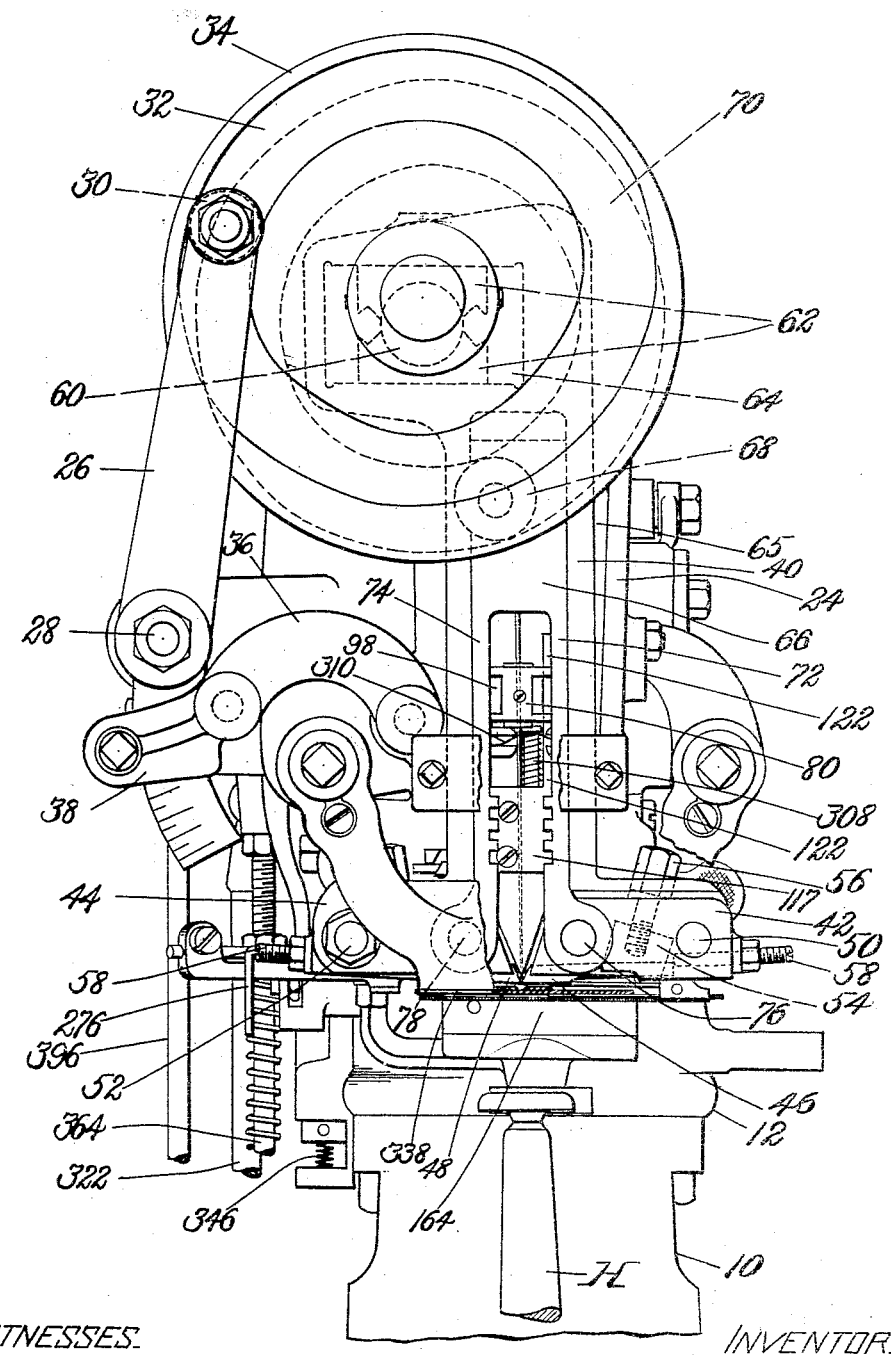

L. A. CASGRAIN.
MACHINE FOR INSERTING FASTENINGS.
APPLICATION FILED SEPT. 5, 1907.

1,054,173.  Patented Feb. 25, 1913.
9 SHEETS—SHEET 1.

WITNESSES
H. Dorsey Spencer
Arthur L. Russell

INVENTOR
Louis A. Casgrain

L. A. CASGRAIN.
MACHINE FOR INSERTING FASTENINGS.
APPLICATION FILED SEPT. 5, 1907.
1,054,173.
Patented Feb. 25, 1913.
9 SHEETS—SHEET 2.
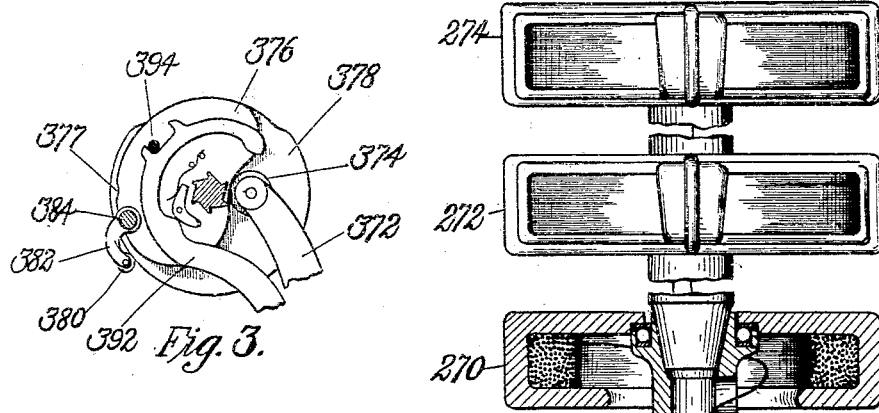
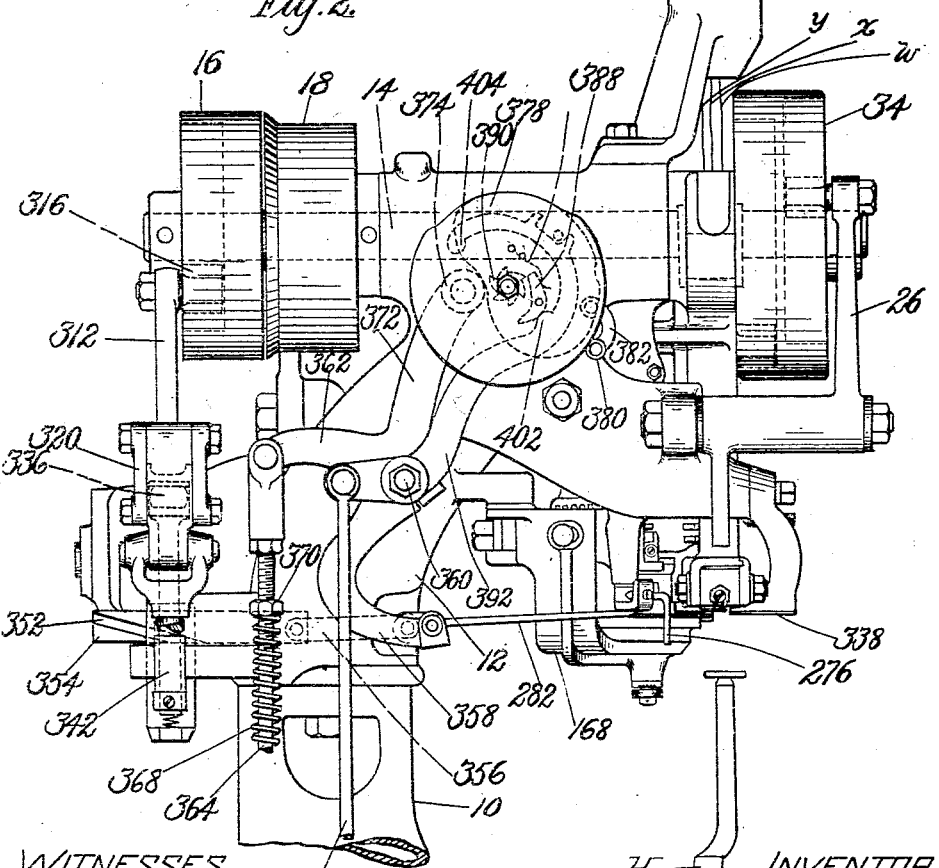
WITNESSES.
H. Dorsey Spencer
Arthur L. Russell
INVENTOR.
Louis A. Casgrain L. A. CASGRAIN.
MACHINE FOR INSERTING FASTENINGS.
APPLICATION FILED SEPT. 5, 1907.

1,054,173.

Patented Feb. 25, 1913.

9 SHEETS—SHEET 4.

WITNESSES
H. Dorsey Spencer
Arthur L. Russell

INVENTOR
Louis A. Casgrain

L. A. CASGRAIN.
MACHINE FOR INSERTING FASTENINGS.
APPLICATION FILED SEPT. 5, 1907.
1,054,173.
Patented Feb. 25, 1913.
9 SHEETS—SHEET 5.
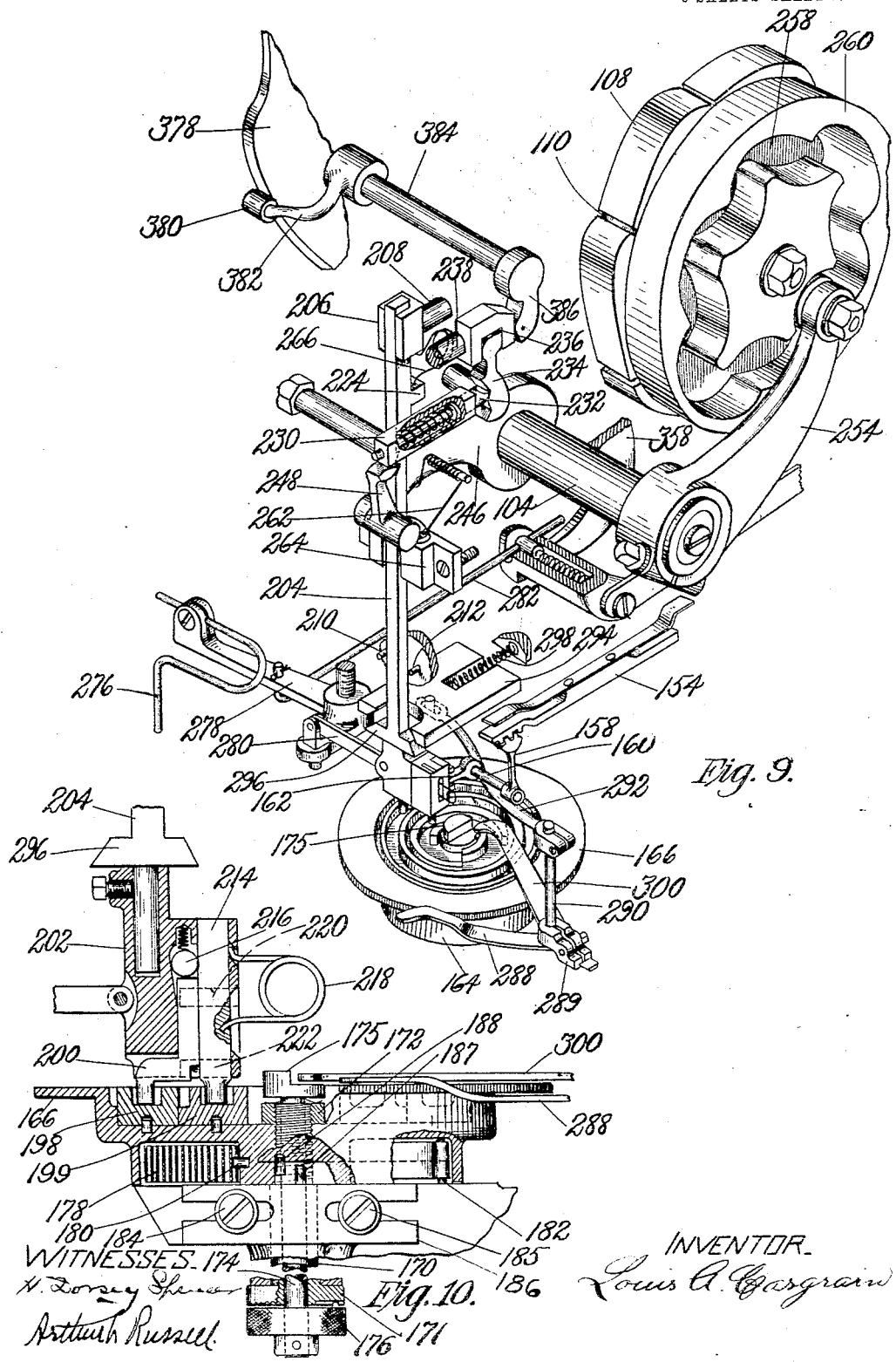

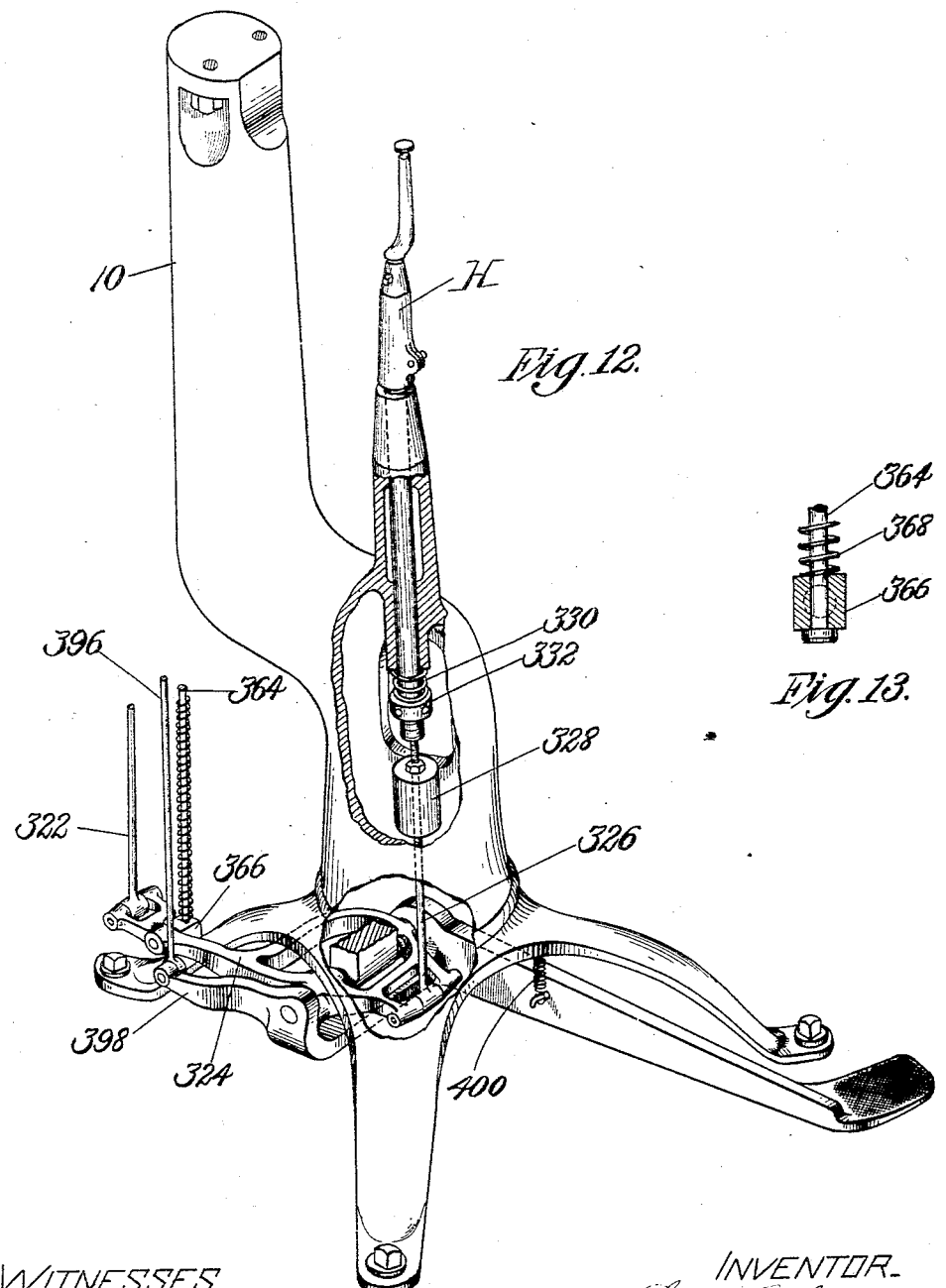

L. A. CASGRAIN.
MACHINE FOR INSERTING FASTENINGS.
APPLICATION FILED SEPT. 5, 1907.
1,054,173.
Patented Feb. 25, 1913.
9 SHEETS—SHEET 8.
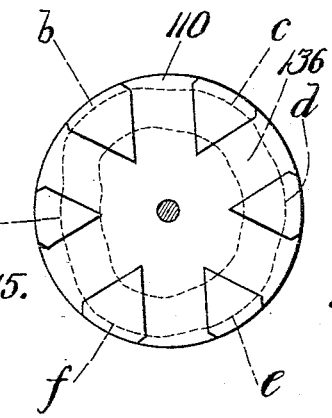
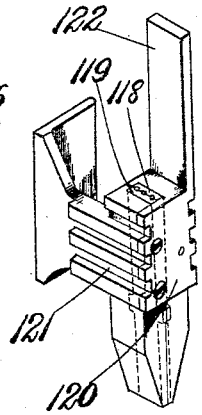
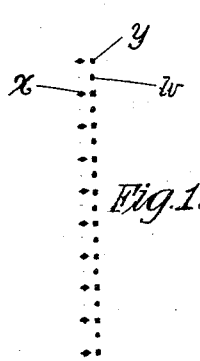
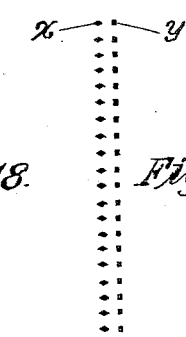
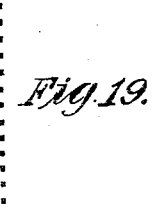
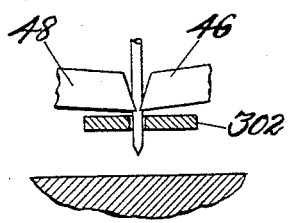
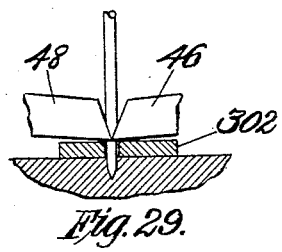
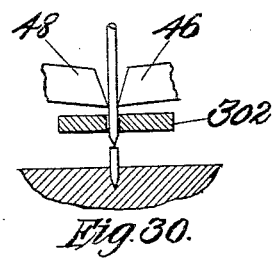
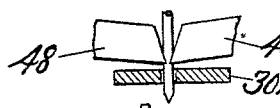
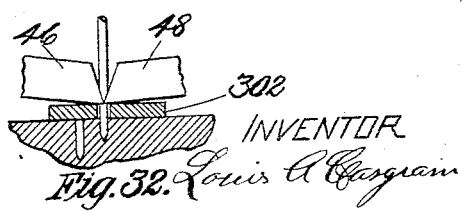
WITNESSES
H. Dorsey Spencer
Arthur L. Russell
INVENTOR
Louis A. Casgrain L. A. CASGRAIN.
MACHINE FOR INSERTING FASTENINGS.
APPLICATION FILED SEPT. 5, 1907.

1,054,173.

Patented Feb. 25, 1913.

9 SHEETS—SHEET 9.

WITNESSES.
H. Dorsey Spencer
Arthur L. Russell

INVENTOR.
Louis A. Casgrain

UNITED STATES PATENT OFFICE.

LOUIS A. CASGRAIN, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR INSERTING FASTENINGS.

1,054,173.  Specification of Letters Patent.  Patented Feb. 25, 1913.

Application filed September 5, 1907. Serial No. 391,521.

*To all whom it may concern:*

Be it known that I, LOUIS A. CASGRAIN, a citizen of the United States, residing at Beverly, in the county of Essex and Commonwealth of Massachusetts, have invented certain Improvements in Machines for Inserting Fastenings, of which the following description, in connection with the accompanying drawings, is a specification, like reference characters on the drawings indicating like parts in the several figures.

This invention relates to machines for inserting fastenings.

Although directed primarily to machines for use in the manufacture of boots and shoes to insert fastenings of various lengths, shapes and kinds, either for uniting permanently or temporarily parts of the boots or shoes, or for purposes of ornamentation or resisting wear, the invention comprehends, nevertheless, principles of construction and operation applicable to fastening inserting machines in general, whether such machines deal with previously formed fastenings, or make and insert, or insert and make, their own fastenings.

The various articles above included under the term "fastening" have, in the arts, various designations according to the particular purposes which they subserve. For the sake of brevity, however, the term "fastening" will be used hereinafter to include everything of a nature to be handled by machines of this kind.

A general object of the invention is to provide a fastening inserting machine which will operate effectively at speeds much in excess of those attained by such machines in use up to the present time.

A particular object of the invention is to provide, in a fastening inserting machine, simple and effective means for inserting in predetermined designs fastenings of one or several kinds, such means being capable, by adjustment or change of parts, of producing a variety of designs.

Machines of this type are frequently used for inserting slugs in the heels of boots or shoes, both to increase the wear resisting qualities of the heels of the boots or shoes and also to form ornamental designs upon the top lifts. This operation, with the machines used up to the present time, has required considerable skill upon the part of the operator to perform it in such a manner that the resultant designs have an artistic and uniform appearance. To permit this operation to be performed by comparatively unskilled labor and at the same time to effect a saving in the time required for it the before-mentioned means for inserting fastenings in designs is preferably made as nearly automatic as is consistent with the nature and individual requirements of the work upon which the machine is to operate, and the parts are preferably so timed that independent movements of the various mechanisms, as well as coöperative movements, are in so far as possible made coincident, the time consumed by the cycle of operations essential to the insertion of a single fastening being thus shortened. The time of the cycle is preferably still further abbreviated by effecting, through single elements of the essential mechanism of the machine, functions of a plurality of separate elements of former constructions, thus cutting down the aggregate space traversed in the different functional movements and permitting a simplification of the construction of the machine.

Another object of the invention is to provide in a fastening inserting machine in which there are a plurality of sources of fastening supply, means for inserting automatically in predetermined order as to kinds of fastenings or lengths of spaces between successive fastenings, or both as to kinds of fastenings and lengths of spaces between successive fastenings, in a single row or in each of several rows, fastenings from said sources of supply and automatic controlling means for causing the insertion of fastenings to be interrupted while predetermined portions of the fastening receiving surface of the work pass the inserting mechanism. The controlling means may be actuated from any part of the machine which moves in timed relation to the movement of the work, but in the preferred embodiment of this invention the controlling means is actuated by the work in its movement, this arrangement presenting that form of construction in which there is the simplest relation between the amount of surface of the work carried past the inserting mechanism by the movement of the work and the amount of operative movement imparted to the controlling means. It is, of course, obvious that the work may be moved either automatically or manually during the time that the insertion of fastenings is interrupted by the controlling means. Inasmuch, however, as it is immaterial at what rate the work is moved or fed while the insertion of fastenings is interrupted by the controlling means, since the insertion of fastenings will not be resumed until a predetermined portion of the fastening receiving surface of the work has traveled past the inserting mechanism, in the preferred embodiment of the invention the work is manually fed during such periods of interruption.

It should be understood that the invention is not limited to the provision in a machine which operates upon a plurality of sources of fastening supply or in a machine which has other design controlling means, of means actuated by the work in its movement to cause the insertion of fastenings to be suspended while predetermined portions of the fastening-receiving surface of the work pass the inserting mechanism. The invention comprehends broadly the provision of such suspending means in any machine for inserting fastenings successively in a row.

The invention is directed also to the provision of means for causing the fastenings which are inserted in the two heels of a pair of shoes to form predetermined right and left designs, i. e., designs which have like general characteristics but which are so arranged upon the respective heels that there lies between the heels an axis of symmetry with respect to the two designs. It adds greatly to the appearance of the shoes when fastenings are being inserted in the heels to form designs which are not symmetrical in themselves, or which are not symmetrically arranged upon the respective heels, to so vary the designs upon the two heels of a pair that the designs will be arranged symmetrically in the pair or, to express it in other words, that the design upon one heel will be like the mirrored image of the design upon the other heel. This gives to the designs right and left characteristics which make them harmonize better with the respective characteristics of the right and left shoes of a pair.

Preferably the means above referred to is constructed to furnish automatically the design suited to the shoe which is to be operated upon after the parts have been placed in proper relation for the insertion of the initial fastening or fastenings of the design, and means is preferably provided also which automatically places the parts in the proper relation to furnish automatically the design suited to the shoe to be operated upon. When other than means controlled by the operator is provided for placing the parts of the design-controlling means in proper position to furnish the design suited to the shoe to be operated upon, it is obviously essential that, unless the shoes are to be presented to the machine in some predetermined order as to individual requirements, the means which automatically selects the design suited to the shoe shall be controlled by some individual or class characteristic of the shoe. Where such characteristic is present in the sole of the shoe, as for example in its contour, a convenient way to effect a design-selecting adjustment of the design-controlling means in accordance with some characteristic of the shoe is to provide selecting means governed by the characteristic of the sole. A construction of this kind, in which a characteristic of the shoe causes to be made, from a plurality of different predetermined designs which the machine is equipped to furnish automatically, a selection of that design which is particularly suited to a shoe having that particular or general characteristic, is believed to be preferable to a construction, for example, in which the design to be formed by the inserted fastenings is controlled throughout the inserting operation by the characteristic or characteristics of the shoe, since it does not necessitate making successive right shoes, or left shoes, exact counterparts of each other in order to provide like designs upon a series of shoes of the same type.

The invention comprehends also novel means for rendering the machine operative to perform its work and for rendering it inoperative after its work has been completed.

In the preferred embodiment of the invention, means is provided for causing the insertion of fastenings to be stopped at a predetermined distance from the edge of a heel at or adjacent to one of the corners of the heel, and said means is preferably arranged to be controlled by the heel in accordance with its contour. In order that the end of a row of fastenings may be gaged from the edge adjacent to another corner of the heel than that which first approaches the inserting mechanism, an important feature of the invention is the provision of means, preferably adjustable, for predetermining the heel corner from the edge adjacent to which the row of fastenings shall be gaged. Under the term "corner" the rounded corners of the heel are included as well as other points upon the edge of the heel at which the contour of the edge changes its direction abruptly. Moreover it will be understood that many features of the automatic stopping mechanism are susceptible of wide application.

In the accompanying drawings, this invention is shown as embodied in a machine containing many of the novel features disclosed in United States Letters Patent No. 1,012,811 to Louis A. Casgrain, dated December 26, 1911, into which the co-pending application, Serial No. 301,473, filed Feb. 16, 1906, matured. This invention is an improvement upon the machine of said Letters Patent in which claims to the novel subject-matter common to the two applications have been made.

Figure 4:
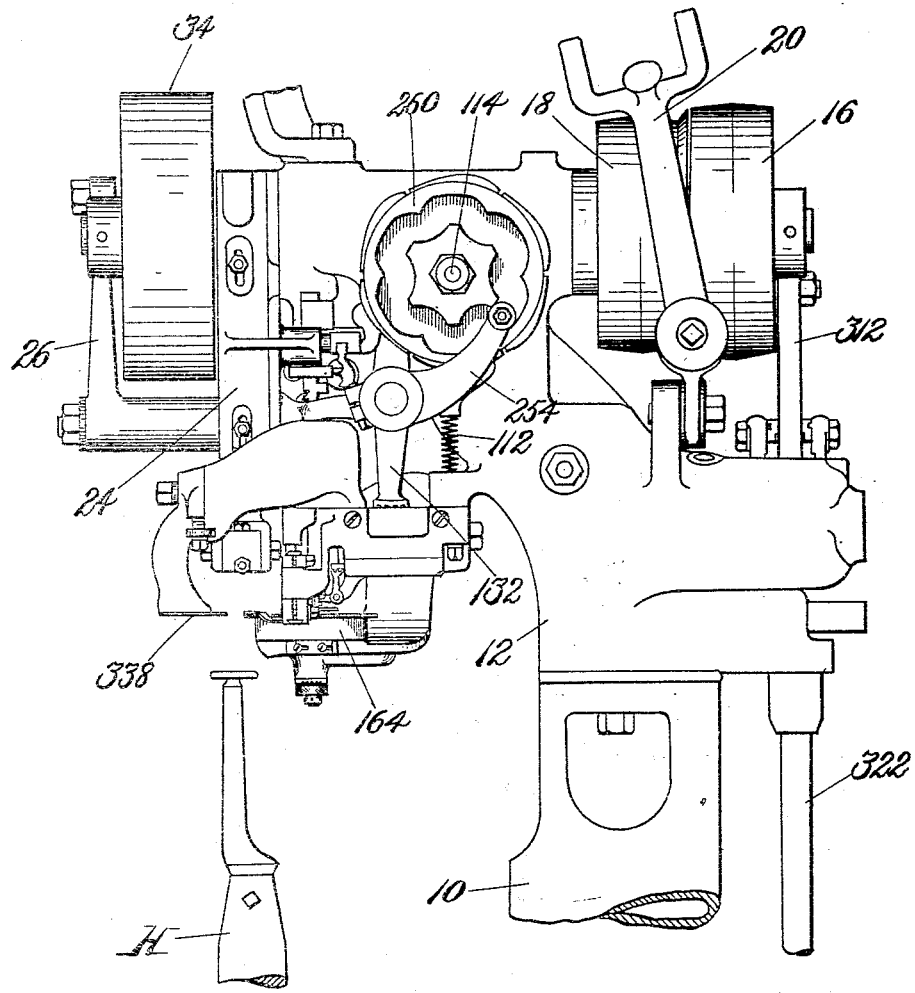
Figures 5, 6:
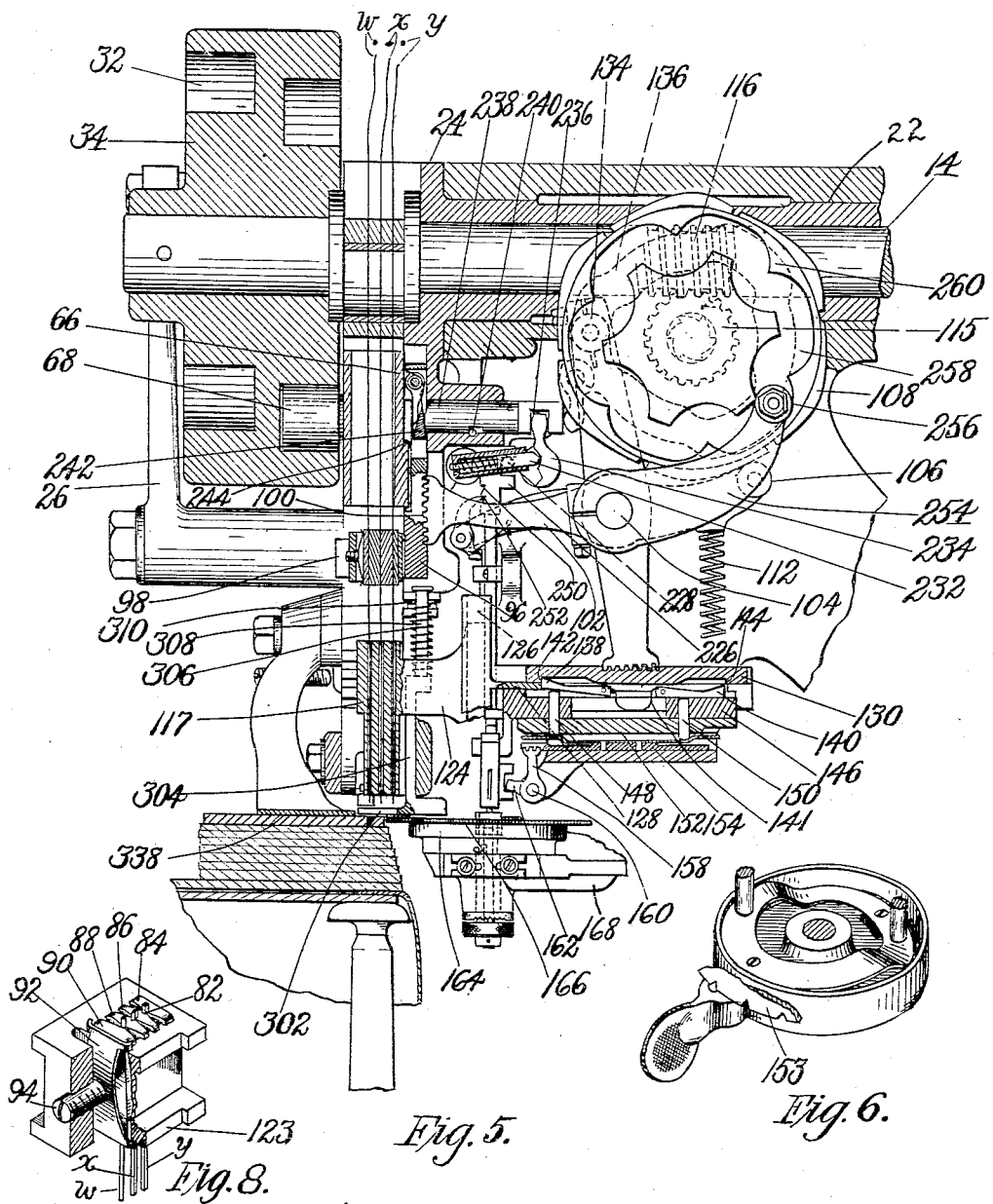
Figures 7, 8:
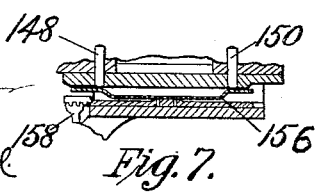
Figure 11:
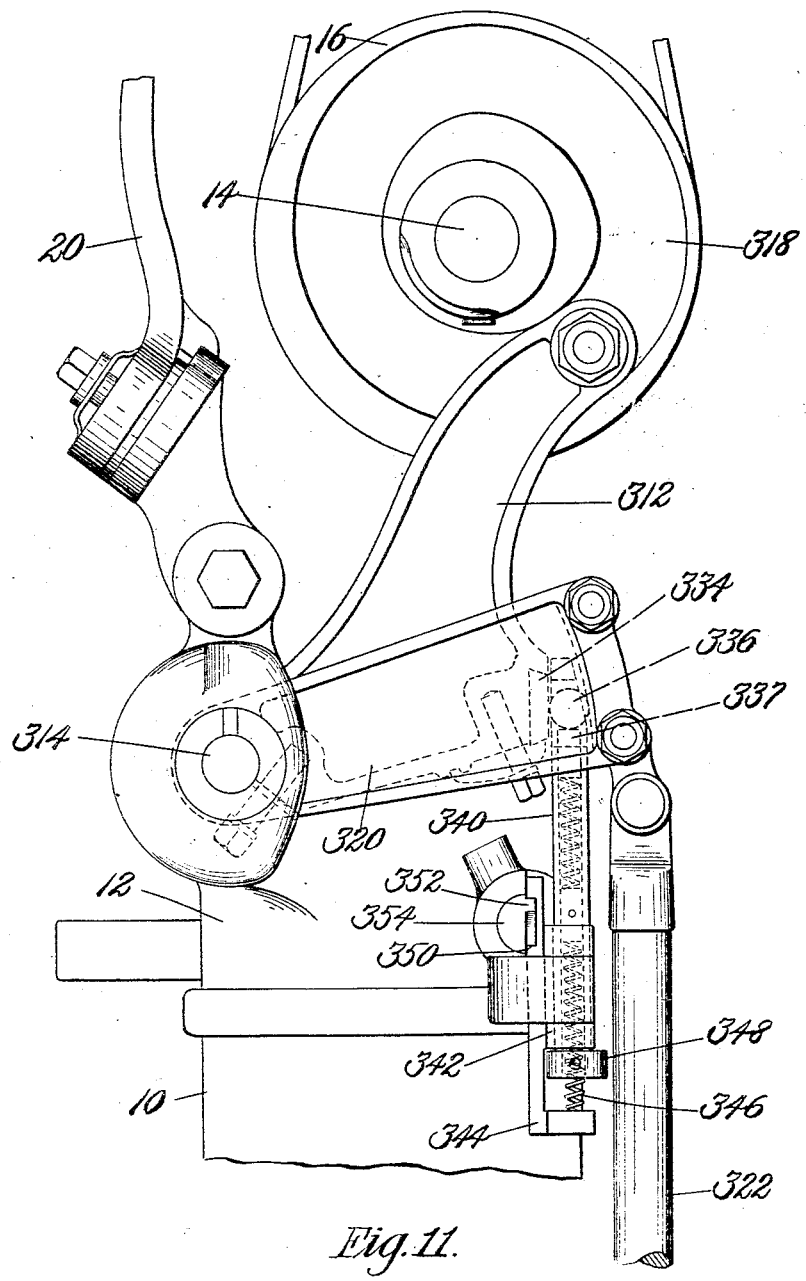
Figure 20:
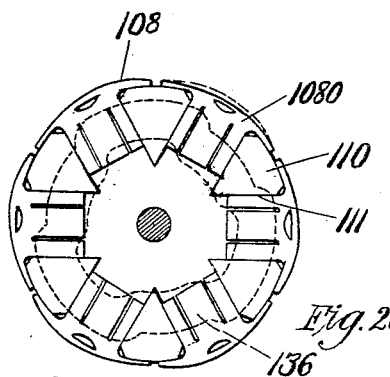
Figure 21:
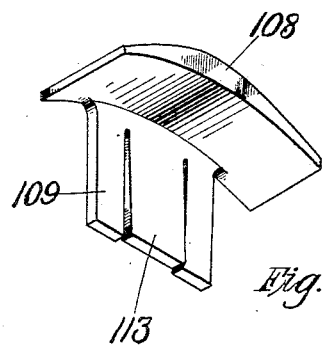
Figure 25:
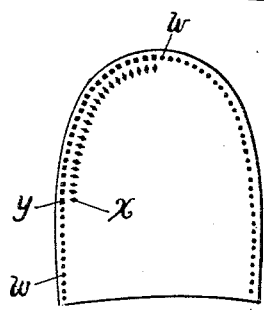
Figure 22:
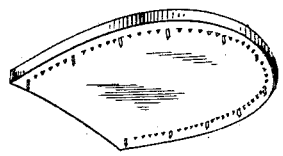
Figure 24:
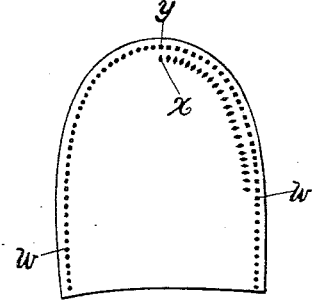
Figure 23:
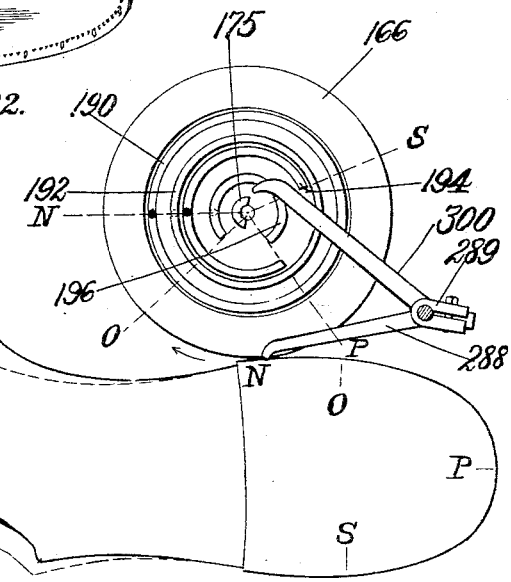
Figure 26:
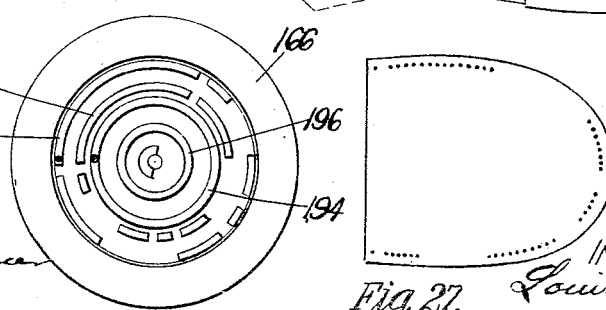
Figure 27:
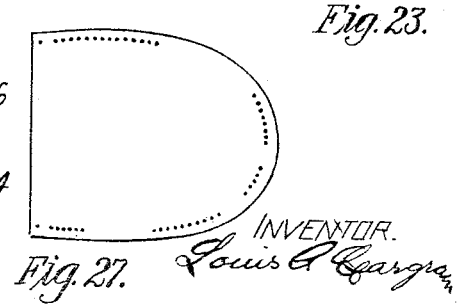

In the drawings:—Figure 1 is a front elevation of the upper portion of the machine embodying the preferred form of the invention; Fig. 2 is a side elevation of the machine illustrated in Fig. 1 but drawn to a smaller scale; Fig. 3 is a perspective view of the actuating cam disk removed and looking from the side opposite to that shown in Fig. 2, coöperating parts of the machine being shown partly in section; Fig. 4 is an elevation of the side of the machine opposite to that illustrated in Fig. 2; Fig. 5 is a longitudinal sectional view, looking from the right, of a portion of the upper part of the machine; Fig. 6 is a perspective view of a modification of one of the design-controlling elements; Fig. 7 is a sectional view showing a modification of the presenter-controlling cam slide; Fig. 8 is a perspective view of the fastening strip retainer; Fig. 9 is a perspective view showing the relative positions of the various mechanism for automatically controlling the insertion of fastenings; Fig. 10 is a view, partly in section, of the design dial and coöperating parts; Fig. 11 is a rear view of the machine showing the horn-actuating lever and connections; Fig. 12 is a view of the base and standard of the machine showing the actuating treadle and the connections through the base from the horn-actuating mechanism to the horn; Fig. 13 is a detail view of a portion of the construction shown in Fig. 12; Fig. 14 is a perspective view of the fastening presenter; Fig. 15 shows in dotted lines the layout of the presenter cam which produces the design shown in Fig. 16; Figs. 17, 18 and 19 illustrate other designs which may be readily produced in this machine; Fig. 20 is a side view of the fastening length cam wheel, looking from the right in Fig. 1; Fig. 21 shows one of the fastening length cams detached from the wheel; Fig. 22 shows a top lift in which every sixth fastening inserted is longer than the other five; this design is produced by the cam wheel illustrated in Fig. 20; Fig. 23 shows in plan and section details of the automatic right and left mechanism and of the mechanism of gaging the distance from the edge of the heel adjacent to one of the corners of the end, or ends, of the row, or rows, of fastenings; Figs. 24 and 25 show right and left top lifts respectively, with right and left designs produced by the design dial shown in Fig. 23; Fig. 26 is a plan view of the design dial showing a different arrangement of the stops from that shown in Fig. 23; Fig. 27 shows the design produced when the inserting mechanism is controlled by the outermost row of stops upon the dial shown in Fig. 26. Figs. 28 to 32, inclusive, illustrate the successive steps in the insertion of a single fastening.

Referring to the drawings, a base or standard 10 supports a head 12 which carries a main driving shaft 14. Upon the shaft 14 are mounted fast and loose pulleys 16 and 18, a belt shifter 20 serving to shift the belt from the loose pulley 18 to the fast pulley 16 when it is desired to connect the machine with a source of power. Such connection is preferably constantly maintained when the machine is in use. A sleeve 22, surrounding the shaft 14 and itself so mounted in bearings in the head 12 as to afford a bearing support for the shaft 14, carries at its front end a swinging frame 24, said frame being shown as integral with said sleeve. The swinging or oscillating movement of the frame 24 effects the feeding of the work over the work support in a manner to be hereinafter described. The said swinging movement is imparted to the frame 24 through a lever 26 pivoted at 28 upon the machine head. At its upper end the lever 26 carries a cam roll 30 which travels in a cam groove 32 in the cam disk 34 attached to the front end of the main shaft 14. A link 36 pivoted at one end to the swinging frame 24 and at its other end connected by a clamp 38 to the lower end of the lever 26 transmits to the swinging frame the movements of said lever. The distance the work is fed between successive fastening-inserting operations may be varied by varying the position of the clamp 38 upon the lower end of the lever 26.

Mounted to reciprocate in the swinging frame 24 is mechanism for gripping, inserting and severing successively from a strip of fastening material fastenings of the same or different lengths. This mechanism comprises, in the construction shown, a reciprocating head 40 upon which are pivotally mounted carriers 42 and 44 for the gripping and severing means, said means being shown as consisting of cutters 46 and 48. The cutter carrier head 40 is shown as shaped like an inverted T and the cutter carriers 42 and 44 are pivoted near their outer ends at 50 and 52 to the respective arms of the T. The cutters 46 and 48 are confined in their respective carriers by dovetailed clamping blocks 54, 54, held in place by headed screws 56, 56. Longitudinal adjustment of the cutters in their carriers is effected through screws 58, 58 mounted in said carriers and bearing against the ends of the cutters, said screws being provided with locking nuts as shown.

The cutter carrier head 40 is connected at its upper end to an eccentric 60 upon the main shaft 14 by a sliding block and slot connection 62, 64 whereby reciprocating movement is imparted to the cutter carrier head by the rotation of the main shaft. A gib 65 adjustably held in the swinging frame 24 is adapted to take up looseness between the cutter carrier head 40 and the swinging frame. A forked slide 66 mounted to reciprocate in the cutter carrier head is provided at its upper end with a cam roll 68 which travels in a cam groove 70 upon the rear side of the cam disk 34. The fork members 72, 74 of the slide 66 are pivotally connected at 76 and 78 to the respective cutter carriers 42, 44. The cam groove 70 in the cam disk 34 is preferably so shaped that at each rotation of the main shaft the slide 66 is caused first to move relatively to the cutter carrier head 40 at the beginning of the downward movement of the head to cause the cutters to move simultaneously toward a line through their pivots and thus to close upon and grip a strip of fastening material lying between them; then to move with the head to hold the cutters positively from movement in either direction relatively to the head while they are being carried downward by the head to force the end of the strip into the work; then to move relatively to the head to cause the cutters to sever the strip after the end has been inserted to the desired point, and finally to move relatively to the head to cause the cutters to separate to permit them to pass freely over the strip in their upward movement. In the construction shown, the gripping movement of the cutters is effected by so shaping the cam groove 70 that the slide 66 holds the cutting edges of the cutters substantially stationary so far as vertical movement is concerned while the outer ends continue to move with the cutter carrier head. This insures the simultaneous gripping of a plurality of fastening strips which may lie between the cutters, provided the strips are also held stationary at this time, since there is no relative movement of the strips and cutters lengthwise of the strips during the gripping movement of the cutters. This prevents also scraping of the sides of the strips at the time they are gripped. The cutters are actuated to sever the strip in a similar manner. Between the gripping and severing actions of the cutters the strip is held gripped by them, and to prevent releasing and premature severing action of the cutters the cam groove 70 is preferably so shaped that at this time it causes the cutting edges of the cutters to move downward at the same speed as the cutter carrier head.

As the cam roll 68 is confined in the cam groove 70, the entire control of the cutters through the slide 66 is obviously positive, this being the preferable construction in a machine intended to run at high speed.

It will be observed from the foregoing description that the cutters are actuated to grip the strip always at the same point in their path of movement. If, therefore, the strip remains stationary after being released by the cutters, the successive fastenings severed from it will be all of the same length. Provision is therefore made for varying the distance from the end of the strip of the point at which it is gripped by the cutters by moving the strip more or less relatively to the point in the path of their movement at which the cutters are actuated to grip the strip. In the construction shown, a strip retainer 80 is mounted to slide vertically between the fork members of the slide 66. Provision is also made for movement of the retainer 80 transversely of the slide 66 for a purpose hereinafter set forth. The retainer 80 is provided with a plurality of strip passages formed by adjacent grooves 82 in the grooved members 84, 86, 88, 90,—see Fig. 8,—each of the passages being shaped to correspond with the shape of the strip which is to pass through it. The passage formed by two adjacent grooves is made somewhat smaller than the strip for which it is intended, so that when the grooved members are pressed toward each other the strip will be frictionally held by them. A curved spring 92, bearing at its ends upon the outer grooved member 90 and pressed against the member 90 with more or less force by an adjusting screw 94, causes all of the grooved members to press upon the adjacent strips and thus yieldingly hold them from movement relative to the retainer. A slide 96 mounted in the back part of the swinging frame 24 has forwardly projecting fork members 98 upon which the retainer 80 is slidingly mounted for movement transversely of the forked slide 66. The fork members 98 are confined in grooves in the sides of the retainer 80 whereby the retainer is compelled to move with the slide 96. The slide 96 is provided at its back with curved rack teeth 100, concentric with the center of oscillation of the swinging frame 24, whereby they may swing with the frame 24 relatively to the teeth upon the adjacent end of a lever 102 with which they are constantly in operative engagement. The lever 102 is loosely mounted upon the rock shaft 104 and at its end opposite the slide 96 carries a cam roll 106 which engages successively cam members 108 upon a cam disk 110 when the inserting mechanism is operating to insert fastenings. At such times the cam roll 106 is held in contact with the cam members 108 by a spring 112 bearing at one end upon the head 12 and at its other end upon the under side of the lever 102. The cam disk 110 is mounted upon a shaft 114, driven by a worm gear 115 from a worm 116 upon the main shaft 14. In the construction shown, the speed ratio of the shaft 114 to the main shaft 14 is as 1 to 6, and the cam disk 110 is accordingly provided with six cam members 108, so spaced about its periphery that one of them operates upon the cam roll 106 at each rotation of the main shaft 14. The amount of movement imparted to the retainer 80 through the slide 96 and the lever 102 by a cam member 108 depends obviously upon the shape of the said cam member, especially upon the amount of its extreme projection from the periphery of the cam disk. By shaping the cam members 108 so that the retainer 80 and with it the fastening strip, or strips, is moved lengthwise more or less relatively to the point in the path of their movement at which the cutters are actuated to grip the strip, or strips, and is kept in the position to which it has been moved until after the strip, or strips, has been gripped by the cutters, a different length of fastening may be obtained from that which would be produced by the normal relative movement of the cutters to a stationary strip or strips. By making different cam members 108 about the periphery of the cam disk 110 of different shapes, successive fastenings of different lengths may be formed. In the construction shown, six different lengths of fastenings in succession are possible, but the number may obviously be varied by constructing the machine with a different speed ratio between the main shaft 14 and the shaft 114.

Within the capacity of the machine as constructed, the order as to lengths in which the fastenings are to be inserted may obviously be varied as desired. As shown in Figs. 20 and 21, each cam member 108 is provided with a shank 109 which fits into a radial groove 111 on the side of the cam disk 110, adjacent to another cam disk 260 also attached to the shaft 114. A spring tongue 113 holds the cam member 108 frictionally in place. The positions of the cam members 108 upon the periphery of the cam disk 110 may thus be readily interchanged or the cam members may be replaced by others of different thicknesses, or, if it is desired to insert successively fastenings of the greatest length provided for in the machine, the cam members may be altogether removed.

By providing a cam member 108, shaped to give to the slide 96 a movement approximately equal to and coincident with that of the slide 66, the fastening length measuring relative movement of the cutters and the fastening strip, or strips, will be reduced to zero and no fastening will be inserted when this particular cam member is controlling the fastening length.

In Fig. 22 is shown a top lift in which the fastenings are inserted in a series made up of groups, each group comprising five short fastenings and one long fastening. This order of lengths is produced by the arrangement of cam members shown in Fig. 20, the cam 1080 producing the long fastening in each group. The long fastenings constitute very effective securing means for a top lift which is to be provided with a row or rows of fastenings for ornamental or wear resisting purposes, or both, and as only a few long fastenings properly distributed are necessary for this purpose, a great saving of material is permitted.

In the construction shown a single fastening length controlling means is provided for all the different rows of fastenings which the machine is constructed to insert simultaneously. It is obvious that by providing a separate retainer for each fastening strip and separate length controlling means for each retainer, it will be possible to insert simultaneously in a plurality of rows fastenings of different lengths.

The cutters 46, 48 for each strip are preferably made wide enough to insert and sever fastenings in more than one row at a time, and in the construction shown they are made wide enough to insert and sever fastenings in two rows at a time. Preferably a plurality of sources of fastening supply is provided. In the construction shown three sources of supply are provided from which are drawn three strips, W, X and Y, of fastening material. These strips may be alike or they may differ in size, shape or nature, as desired. The strips are passed down through the retainer 80 and through passages in a presenter 117, these passages being spaced apart the distance apart it is desired to have the rows of fastenings. The passages are shaped to correspond with the shape of the fastening strips which are passed through them and as shown in Fig. 14 are formed by adjacent grooves in two blocks 118, 119, confined in a space formed by recessing the adjacent faces of the two members 120, 121 of the presenter and held against vertical movement relatively to the presenter by laterally projecting lugs resting the front end of an actuator bar 128.

The presenter 117 is mounted between the fork members 72 and 74 of the slide 66, the adjacent sides of the presenter and the fork members having interlocking tongues and grooves which permit of movement of the presenter transversely of the slide 66 while compelling movement of the presenter vertically with the slide. By the movement of the presenter transversely of the slide 66 and likewise transversely of the cutter carrier head 40, the fastening strips are moved relatively to the cutters 46 and 48. The strips may thus be moved so that fastenings from the same strip will be inserted in different rows, or fastenings from different strips in the same row, or they may be moved to place one or more beyond the reach of the cutters and again within reach, whereby different spacings of the fastenings in any row may be effected. By thus varying the relative positions of the fastening strips to the inserting mechanism whereby fastenings may be selected from different sources of supply for insertion in the same row or from a single source of supply for insertion in a plurality of rows, or both, with the attendant possibilities of varying the spacing of the fastenings in the different rows, the possibility for variety in design effects is comparatively great. Moreover fastenings of selected lengths may be taken from selected sources of supply.

Extending upward from the presenter 117, as shown in Fig. 1, is an ear 122 which enters a groove 123,—see Fig. 8,—in the retainer 80 and compels movement of the retainer with the presenter transversely of the slide 66.

Means is preferably provided for causing the presenter to present the fastening strips to the inserting mechanism in predetermined order. In the construction shown, the presenter has an L-shaped rearward extension 124 which engages a vertically extending slot 126 in a vertically extended portion at the front end of an actuator bar 128. Mounted in a guideway in the actuator bar 128 is a rack-toothed bar 130 with the teeth of which engage the corresponding teeth upon the lower end of a lever 132, loosely mounted upon the rock shaft 104. The lever 132 carries at its upper end a cam roll 134 which travels in a pattern cam groove 136 formed on the side of the cam disk 110 away from the cam disk 260. The cam groove 136 is so shaped as to impart to the rack toothed bar 130, through the lever 132, a reciprocating movement. Different shaped cams may be used to cause the reciprocating movement to extend over two or more revolutions of the main shaft as desired within the capacity of the machine, as determined by the speed ratio between the shaft 14 and the shaft 114, or to cause the reciprocating movement to be variously modified or broken up so long as the actuator bar 128 is not moved by the rack-toothed bar 130 while the fastening strip is gripped by the cutters. The cam disk 110 in which the cam groove 136 is formed is continuously rotated through its connection with the main shaft 14.

Means is provided for connecting the presenter actuating bar 128 and the bar 130, so that the bar 128 will partake either of the full reciprocating movement of the bar 130 or of the movement in one direction only. As here shown, two dogs 138 and 140 are pivoted to the actuator bar 128 and are adapted to engage shoulders 142 and 144 on the underside of the rack-toothed bar 130 for connecting the two bars together. When both of said dogs are in operative position the actuator bar will partake of the full reciprocating movement of the rack-toothed bar and the presenter 117 will be moved into different positions to present different selections of fastenings to the inserting mechanism in accordance with the layout of the cam groove 136. When the dog 140 is inoperative, the actuator bar and the presenter will be moved rearwardly or to the right as shown in Fig. 5 by the rack-toothed bar, and will remain in this position until the dog 140 is again moved into operative position, the rack-toothed bar meanwhile reciprocating back and forth in the guideway in the actuator bar without imparting any movement to said actuator bar and consequently only one selection of fastenings will be inserted successively. When dog 138 is inoperative, the actuator bar and the presenter will be moved forwardly or to the left in Fig. 5 and a different selection of fastenings will be inserted successively until the dog 138 is again moved into operative engagement with the reciprocating rack-toothed bar. It will be understood that in the embodiment of the invention herein illustrated the friction between the movable parts is relied upon to control the presenter to maintain it in a predetermined position after its disconnection from its positive actuating means. The means for actuating the rack-toothed bar and the connection between the rack-toothed bar and the actuator bar are substantially the same as in the copending application hereinbefore cited. The operative and inoperative positions of the dogs 138 and 140 are controlled by two plungers 148 and 150, sliding in openings in the support 146 for the actuator bar and bearing upon the under side of the dogs. The dogs are held yieldingly in their lowermost position both by gravity and by the action of a spring 141 bearing upon their inner ends above their pivots.

Removably attached to the under side of the support 146 is a support 152 in which are guide openings for the plungers 148 and 150; and a guideway for a cam slide 154 carrying a spring-cam 156 adapted to act upon the lower ends of the plungers. The spring cam 156 has a portion adapted to raise each plunger as it is moved under the plunger and in Fig. 5 these portions are shown as spaced apart such a distance that when the cam slide 154 is moved in either direction by the means there shown, it moves one of the raising portions of the cam under one plunger at the same time that it moves the other raising portion from under the other plunger. This serves to bring only one dog at a time into engagement with its corresponding shoulder on the under side of the rack-toothed bar 130, so that the actuator bar is connected to the rack-toothed bar for movement in one direction only.

With the cam groove 136 shaped as shown in Fig. 5, when the dog 138 is moved into engagement with the shoulder 142, the actuator bar 128 and the presenter 117 are moved to the right by the rack-toothed bar 130 and the strip W is brought into position to be acted upon by the cutters. When the dog 140 is moved into engagement with the shoulder 144 the actuator bar 128 and presenter 117 are moved to the left and the strips X and Y are brought into position to be acted upon by the cutters. If the spring cam 156 be constructed and mounted as shown in Fig. 7, so that in one position of the slide 154 the two raising portions engage the plungers at the same time and in another position only one of the plungers is engaged by a raising portion, with the same layout of the pattern cam groove 136 a design will be formed in which those portions controlled by the cam groove, when both dogs are in operative position, will be made up of alternate selections of fastenings from the strip W on the one hand, and the strips X and Y together on the other hand, and the portion controlled by the pattern cam groove when only a single dog is in position will be made up of selections from the strip W or from the strips X and Y together, according as the dog 138 or the dog 140 is left in raised position when the cam slide 154 is moved to drop one of the two plungers.

The cam slide 154 is provided at its forward end with rack teeth with which engage corresponding rack teeth upon an arm 158 mounted upon a rock shaft 160 in a bracket on the support 152. At its other end the rock shaft 160 is provided with a finger 162 which is adapted to be engaged by means hereinafter to be described to cause the arm 158 to move the cam slide 154 either to the right or to the left.

In Fig. 6 is shown a modification of the means for actuating the plungers 148 and 150 to place the dogs in operative or inoperative position. This means may be substituted for that shown in Fig. 5 by simply removing the support 152 with its attached parts and attaching the support 153, a portion of which is shown in Fig. 6. The means shown in Fig. 6 is identical with that shown in Fig. 7 of the co-pending application above referred to, and for a detailed description thereof reference may be had to the specification in said application.

Preferably automatic means is provided for effecting the movements of the cam slide 154 shown in Figs. 5, 7 and 9 at predetermined times while a piece of work is being operated upon by the machine. The times at which movement is imparted to the cam slide may be determined in any suitable way as, for example, by the number of fastenings inserted, or by the amount of fastening-receiving surface that passes the inserting mechanism before a movement, or between the movements, of the slide. In the construction illustrated, a controlling dial 164 having a milled flange 166 adapted to be engaged by the edge of the work and to position it properly upon the work support with respect to the inserting mechanism is rotatably mounted upon a bracket 168, attached to the machine head. A sleeve 170, screw-threaded at its upper end and provided at its lower end with a flange 171 having teeth upon its lower face is screwed into the hub of the dial and is provided with a lock nut 172 bearing upon the face of the dial. The sleeve 170 is rotatably mounted in the bracket 168 and turns with the dial 164. Passing through the sleeve 170 is the shank 174 of a segment-shaped feeler controlling stop 175, said shank carrying upon its lower end a knurled nut 176, by which the segment 175 may be placed in different angular relations to the dial. A curved spring between the segment 175 and the nut 172 presses a pin upon the upper surface of the knurled nut 176 into engagement with one of the teeth on the flange 171 and keeps the segment 175 in the position to which it is turned. A coil spring 178 surrounding the hub of the dial in a recess on the under side thereof is connected at one end to a pin 180 upon the hub and at the other end to a pin 182 upon the bracket. Adjustably held upon the bracket 168 by screws 184, 185 is a plate 186 carrying a stop pin 187 with which a pin 188 on the under side of the dial is adapted to be held yieldingly in contact when the dial has not been partially rotated by engagement with the work. The spring 178 is put under an increased tension by the rotation of the dial in the work-feeding direction, whereby, when the dial is released by the work, the spring quickly returns it to initial position with the pin 188 in contact with the stop pin 187. The face of the dial is shown as depressed below the milled flange 166. Upon the face of the dial are carried pairs, 190, 192 and 194, 196, of series of stops arranged concentrically with respect to the center of rotation of the dial. Those stops which are in immediate succession may be made integral with each other, in which case a continuous series around the dial would form a ring as shown at 190, 192, in Fig. 23. For convenience in replacing one series of stops by another the pair of series 190, 192 is mounted upon an annular base 198 held in position upon the dial by dowel pins as shown in Fig. 10 and the pair 194, 196 is mounted upon another similar base 199, similarly held in position. The series in each pair are spaced apart upon the base at a distance sufficient to allow the engaging pins, to be hereinafter described, to pass down between them and engage the base. Only one of each pair of series of stops is intended to be used at one time. One of the pair of series 190, 192, is adapted to coöperate with a pin 200 slidingly mounted in a pin holder 202 attached to the lower end of the vertically reciprocating slide bar 204 when the pin holder has been moved to bring the pin over the one of the pair with the members of which it is to engage. To provide for movement of the pin holder 202, to bring the pin 200 over either of the series of stops 190, 192, the guide 206 at the upper end of the slide bar 204 is mounted upon a pivot 208 having its bearing in the machine head. The lower end of the slide bar is thus permitted to swing within limits determined by stop pins 210, 212, upon the machine head at opposite sides of the bar. With one of the series of stops 194, 196, according to the position of the pin holder 202, is adapted to engage a second pin 214, slidingly mounted in the holder 202, the holder being in proper position to bring the pin 214 into operative relationship to the series 194 when it has been moved to place the pin 200 in operative relationship to the series 190. In the same way the pins 200 and 214 are adapted to coöperate simultaneously with the respective series 192 and 196. The pin 200, the shank of which is offset to bring it adjacent to the shank of the pin 214, has a sliding movement in the holder 202 sufficient to cause it to knock loose at each reciprocation of the slide bar 204 the spring-pressed locking ball 216, which engages the pin 214 on one side and the inclined wall of the holder 202 on the other side to lock the pin in the position to which it has been moved by engagement with one of the stops. This movement of the pin 200 releases the pin 214 at each reciprocation of the slide bar 204, so that the pin 214 will be kept in raised position with respect to the holder only when engaged by stops at successive reciprocations of the slide bar. The return of the pin 214 to its lowermost position is insured by a spring 218 connected at one end to the pin and at the other end to the holder. Projecting from the back side of the pin 214 are two lugs 220, 222, between which lies the end of the finger 162 and which are adapted to raise the end of the finger 162 or depress it, according as the pin engages a stop or does not engage one, whereby the cam slide 154 is moved in one direction or the other by the arm 158 upon the rock shaft 160 to vary the relative position of the dogs 138 and 140. Projecting from the back side of the slide bar 204 are lugs 224, 226, respectively above and below a pin 228 projecting laterally from a casing 230 pivoted at one end and having projecting from its other end a spring-pressed plunger 232. The plunger 232 is pressed by its spring into one of two notches upon opposite sides of the pivotal center of an actuating lever 234, said lever having an arm extended into a slot 236 in a sliding bolt 238 held for limited movement in an opening in the swinging frame 24 by a pin and slot connection 240.

A locking pawl 242 pivoted in an opening in the upper part of the slide 96 is spring-pressed into engagement with the forward end of the bolt 238. When pushed forward by the bolt 238, the pawl 242 is adapted to engage a ledge 244 upon the back of the slide 66 whereby the slide 96 is locked to the slide 66 for the greater part of the movement of the latter and there is no fastening measuring relative movement of the retainer 80, carried by the slide 96, and the cutters, and no fastening is formed or inserted. After the operator has pressed the treadle or other manually controlled means for rendering the machine operative to insert fastenings, the position of the sliding bolt 238 and therefore of the pawl 242 is obviously dependent upon the position of the spring-pressed plunger 232 with respect to the pivotal center of the actuating lever 234. When the end of the plunger is in the notch above the pivotal center of the lever 234, the lever is moved in a direction to place the forward end of the bolt 238 in its rearmost position, the pawl 242 is disengaged from the ledge 244, the slide 96 is free to move relatively to the slide 66 and the parts are in position for the insertion of fastenings. When the plunger 232 is in the notch below the pivotal center of the lever 234, the bolt 238 is moved forward, the slides 96 and 66 are locked together by the pawl 242 and no fastenings can be inserted. It will be noted that the engaging end of the plunger 232 is beveled from a central edge and that the adjacent sides of the notches in the lever 234 slope gradually to a central ridge, so that the plunger may be pushed from one notch into the other simply by overcoming the pressure of its spring. The plunger casing is moved to move the plunger from one notch upon the lever 234 into the other by the engagement of one of the lugs 224, 226, upon the reciprocating slide bar 204 with the pin 228 upon the plunger casing.

The means for reciprocating the slide bar 204 comprises an arm 246 carrying at its forward end a pawl 248 adapted to engage one of two notches 250, 252, upon the slide bar 204, to raise said bar. At its rear end the arm 246 is attached to the rock shaft 104. Extending rearwardly from the rock shaft 104 and attached thereto is an arm 254 carrying a cam roll 256 traveling in a cam groove 258 in a cam disk 260 attached to the shaft 114. The cam groove 258 is so shaped as to cause the rock shaft 104 to be oscillated, thereby raising and lowering the arm 246 and pawl 248, at each rotation of the main shaft 14. A spring 262 bearing at one end upon the arm 246 and at its other end upon the tail of the pawl 248 presses the pawl normally toward the slide bar 204. Upon the downward movement of the arm 246, however, the tail of the pawl engages the upper surface of a guide 264 for the slide bar and rocks the pawl away from the slide bar. The slide bar is thus released at each rotation of the main shaft and is moved downward by gravity and by a spring 266 until the pin 200 strikes the surface beneath it and checks further downward movement. If the pin 200 strikes one of the stops in either the series 190 or the series 192, the slide bar 204 will be held in such position that the pawl 248 upon its next upward movement will engage the lower notch 252 in the slide bar, and will raise the bar sufficiently to cause the lug 226 to engage the pin 228 upon the plunger casing and push the plunger 232 from the lower notch in the lever 234 into the upper, if this has not previously been done. As hereinbefore pointed out, with the plunger 232 in the upper notch in the lever 234 the machine is operative to insert fastenings. If the pin 200 in its descent falls into a space in one of the series 190, 192, where there is no stop or falls between the series 190, 192, the lug 224 will engage the pin 228, the plunger 232 will be moved into the lower notch upon the lever 234 and the bolt 238 will be moved forward to cause the pawl 242 to lock together the slides 96 and 66. With the slide bar 204 in this position, the pawl 248 upon its upward movement will engage the upper notch 250 on the slide bar and the bar will not be lifted far enough to cause the lug 226 to move the plunger 232 from the lower back to the upper notch upon the lever 234.

From the decription that has gone before, it will be seen that the series of stops 190 and 192 predetermine the order of the interruptions of the fastening-inserting operation, and that the series 194 and 196 predetermine the order of the automatic changes in the relationship between the fastening presenter and its controlling pattern cam. By varying either the number or the position, or both the number and the position, of the stops in any of the series upon the dial one of the predetermined designs in which fastenings are to be inserted by the machine will be varied without the necessity of changing the shape of the pattern cam groove 136. Obviously, of course, the design may be further varied as in the machine of the pending application above referred to by substituting for the cam disk 110 a disk having a different layout of the pattern cam groove 136. An example of a design that may be produced with a different layout of the pattern cam groove 136 is shown in Fig. 16, the cam groove which produces this design being shown in dotted lines upon the cam disk 110 in Fig. 15. When this design is produced the dogs 138 and 140 are kept in the position shown in Fig. 7 and the actuator bar 128 and rack tooth bar 130 move together in both directions. It will be seen from Fig. 16 that a single reciprocation of the rack tooth bar 130 in this case extends over six rotations of the main shaft 14, or over six separate fastening-inserting operations. The machine illustrated is provided with three sources of fastening supply comprising three fastening strips, $w$, $x$ and $y$, drawn from coils contained in three reels, 270, 272 and 274 constructed and mounted in substantially the same manner as the reels disclosed in the United States Letters Patent to Louis A. Casgrain, No. 1,001,815, granted August 29, 1911, for improvements in reel supports, to which reference may be had for a more detailed description of these parts. The strip $w$ is shown as being circular in cross section, the strip $x$ as diamond shaped and the strip $y$ as square. In producing the design as shown in Fig. 16 it will be noted that the middle strip $x$ is omitted. The actuator bar 128 and rack toothed bar 130 being locked together during the successive fastening-inserting operations, when the cam roll 184 upon the lever 132 arrives at the part $a$ in the cam groove 136 the presenter 117 will be moved to its extreme forward position bringing the strip $y$ between the cutters and moving the strip $w$ beyond them as shown in dotted lines in Fig. 16. In this position the fastening identified by the reference letter $a$ in Fig. 16 will be inserted. When the cam roll 134 arrives at $b$ in the groove 136, the strip $y$ will be moved backward out of reach of the cutters and the strip $w$ will be moved between them but into a position slightly in front of that in which the strip $y$ was acted upon by them, and the fastening indicated by $b$ in Fig. 16 will be inserted. Likewise the fastenings indicated by $c$, $d$, and $e$ and $f$ in Fig. 16 will be positioned in the design by the correspondingly lettered parts of the cam groove 136 at successive rotations of the main shaft 14 and then, since the speed ratio of the shaft 114 to the shaft 14 is as one to six the cam disk 110 will complete its rotation bringing the strip $y$ again between the cutters. In producing this design the series of stops with which the pin 200 coöperates must be continuous if the zigzag row of fastenings is to be continuous, as it is shown in Fig. 16.

The designs shown in Figs. 17, 18 and 19 are produced by the cam groove 136 shaped as shown in Figs. 5 and 20, which, when the actuator bar 128 and rack toothed bar 130 are connected to move together in both directions places, at alternate fastening-inserting operations, the strip $w$ between the cutters and then both the strips $x$ and $y$, the strip $y$ being brought into the position before occupied by the strip $w$, producing thereby the design shown in Fig. 17, provided as above the series of stops coöperating with the pin 200 is continuous and provided also the connection between the actuator bar 128 and the rack tooth bar 130 is not interrupted. When the dog 138 is in contact with the shoulder 142 and the dog 140 is in its lowermost position, the design shown in Fig. 18 is produced. With the positions of the dogs reversed, the dog 140 being in contact with the shoulder 144, the design shown in Fig. 19 is produced. When designs like those shown in Figs. 16 to 19 are to be produced, the manually operated device shown in Fig. 6 for controlling the positions of the dogs may be used, since the positions of the dogs do not need to be changed during the operation of the machine upon a single piece of work. When, however, it is desired to produce automatically more complicated designs the mechanism shown in Fig. 5, which is constructed to furnish automatically two different arrangements of the dogs 138 and 140, is preferably used.

A design which it has been difficult to produce with desired uniformity is one like that shown in Figs. 24 and 25 which has a feature that is differently placed in the design, according as the design is to be upon the heel of a right shoe, or upon the heel of a left shoe of a pair. As hereinbefore pointed out it is preferable to so arrange upon the respective heels of a pair of shoes a design which is not symmetrical in itself, that it will not mar the symmetry of the pair when the bottoms are seen side by side. As the work is fed by the machine always in the same direction, to reverse by manual control of the inserting mechanism the order in which the distinctive features of a complicated design appear in a right shoe to suit it to a left shoe is practically impossible with machines which run at ordinary speeds and might be fairly held to be impossible with machines designed to run at high speeds.

With the mechanism hereinbefore described, it is possible to insert automatically with one passage of the work beneath the inserting mechanism a design like that shown in Figs. 24 and 25 which is a comparatively simple design, or to insert designs which are much more complicated, and have the features of the design upon the left heel of a pair of shoes appear in an order exactly the reverse of that in which they appear upon the right heel.

In the embodiment of the invention illustrated, the machine is constructed to furnish two different predetermined designs, the design furnished being dependent upon the position of the pin holder 202 over the dial 164. If the holder be moved by the slide bar 204 into a position to bring the pin 200 over the series of stops 190 and the pin 214 over the series 194, one design will be furnished while if the holder be moved into a position to bring the pins 200 and 214 over the series 192 and 196 respectively, another design will be furnished, provided the arrangement of the stops in the latter two series for corresponding angles of rotation of the dial differs from that in the first two. It is, therefore, obviously possible to so arrange the stops in the series that the series 192 and 196 will cause a design to be furnished wherein the order in which the features of the design appear is the reverse of that in which the like features of the design controlled by the series 190 and 194 appear. Such an arrangement of the series is shown in Fig. 23 and also in Fig. 26. The design shown in Fig. 24, which is intended for a heel of a right shoe, is produced when the pins 200 and 214 are positioned respectively over the series 190 and 194 in Fig. 23, and the design shown in Fig. 25, which is intended for a heel of a left shoe, is produced when the said pins are respectively over the series 192 and 196 in Fig. 23. When the pins 200 and 214 are in position to coöperate with the series of stops 190 and 194 respectively, as shown in full lines in Fig. 23 and the presenter is controlled by a pattern cam groove 136 like that shown in Figs. 5 and 20, at least one fastening will be inserted at each operation of the inserting mechanism since the series of stops 190 is continuous. As no space in the series 194 in Fig. 23 will come under the pin 214 until the dial has been rotated by the shoe to bring the radial line P into the position now occupied by the radial line N, the pin 214 will be kept in its raised position, the cam slide 154 shown in Fig. 5 will remain in the position there shown, the presenter 117 will be moved backward with the rack toothed bar 130 bringing the strip $w$ between the cutters and will remain in this position until the dial has been rotated to bring a portion of the continuous space between the radial lines P and N under the pin 214. When the dial has thus been rotated to bring a space in the series 194 under the pin 214, the said pin upon being released by the upward movement of the pin 200 as it contacts with one of the series of stops 190 will move down, causing the cam slide 154 to lower the dog 138 and raise the dog 140 whereby the presenter-actuating bar 128 is connected to the rack toothed bar 130 for forward movement. The presenter is now moved forward bringing strips $x$ and $y$ between the cutters, the strip $y$ being brought into the position before occupied by the strip $w$. The parts will remain in this position until a stop is again brought under the pin 214 which will occur, when the dial is constructed as shown in Fig. 23, after it has been rotated to bring the radial line S into the position originally occupied by the radial line N. A stop in the series 194 now meeting the pin 214 in its descent with the slide bar 204 the presenter will be moved backward bringing the strip $w$ again between the cutters, and moving the strips $x$ and $y$ beyond them.

The parts upon the periphery of the heel which are under the inserting mechanism at the different times when the presenter is moved to vary the number of the kinds of fastenings to be inserted at each fastening-inserting operation have been indicated at Fig. 23 by letters corresponding to those attached to the radial lines.

The manner in which the designs shown in Figs. 24 and 27 are produced will be readily apparent from the foregoing description. The design shown in Fig. 27, which is intended for the heel of a right shoe, illustrates the effect of providing spaces in the series of stops with which the pin 200 coöperates, this design being produced by the series 190, and having the spaces in the design corresponding to the spaces in the series. It will be noted from the arrangement of the spaces in the series 192 that the design produced by it will have features like those of the design shown in Fig. 27, but arranged in reverse order, thereby adapting it for the heel of the left shoe. The series 194 and 196 are shown as continuous in Fig. 26.

When the dial is provided with a plurality of differently spaced series of stops for either the pin 200 or the pin 214, especially when the dial is provided with a right design and a left design as shown in Figs. 23 and 26, means is preferably provided for automatically positioning the pins to coöperate with the series of stops furnishing the design suited to the shoe to be operated upon. In the construction shown of means for this purpose advantage is taken of the fact that, as ordinarily made, the side of the sole of one of the shoes of a pair will extend in toward the machine farther than the side of the sole of the other shoe when the shoe is placed upon the work support with its heel in position to receive the initial fastening of the design. When the shoes are presented to a machine like that illustrated in which the work-feeding mechanism feeds the work from right to left, the sole of the right shoe of a pair, when the heel is in proper position to receive the initial fastening of a design, will project in farther than the sole of a left shoe when in corresponding position. A feeler 276 is therefore provided adapted to be moved into contact with the sole of the shoe to be operated upon and by its position to determine which of the designs that the machine is equipped to furnish shall be inserted in this shoe. The sole feeler 276 is adjustably attached to one arm of an angle lever 278 pivoted upon the machine head, the stem of the feeler being bent so as to permit adjustment longitudinally of the shoe through its connection with the arm and having a U-shaped portion as shown which permits forward or backward adjustment by bending and also allows the feeler to yield when the pin holder is held against movement toward the left. The other arm of the angle lever is connected by a link 280 to the pin holder 202. Connected to the arm of the angle lever which carries the feeler is a rod 282 frictionally connected to one arm 358 of a three-armed lever constituting a part of the actuating mechanism of the machine. When the actuating mechanism is set in operation, the arm 358 is moved forward, thereby moving the feeler 276 until it contacts with the edge of the sole of the shoe to be operated upon after which the rod 282 slips through its frictional connection with the arm 358 for the remainder of the movement of the latter. If a right shoe be in position to receive the initial fastening of a design in its heel, as shown in full lines in Fig. 23, the sole feeler will be moved into its full line position there shown, and consequently the pin holder 202 will be moved to place the pins 200 and 214 over the series of stops 190 and 194 respectively. If a left shoe be in position to receive the initial fastening of a heel design, as shown in dotted lines in Fig. 23, the sole feeler will be moved forward to its dotted line position there shown, when the actuating mechanism is set in operation, and the pin holder will be moved to place the pins 200 and 214 over the series of stops 192 and 196, respectively.

It will be noted that the presenter cam groove 136 is formed in the cam disk 110 which carries the fastening length controlling cam members 108 and that, therefore, the selection of fastenings from the different sources of supply bears a determined relation to the lengths of the fastenings when the presenter is moved by its cam groove. It will be readily understood, therefore, that with this construction fastenings of predetermined lengths may, if desired, be taken from predetermined sources of supply and that, for example, the long fastening, hereinabove referred to, might be formed from that one of the fastening strips which has the best holding properties.

Automatic means is preferably provided for stopping the insertion of fastenings at a predetermined point upon the work. This means also is preferably controlled by the work. As shown, a heel feeler 288 adapted to bear at one end against the edge of a heel of the shoe being operated upon, is connected at its other end to a rock shaft 290, having an arm 292 connected by a pin and slot connection with a spring-pressed slide 294. The slide 294 when in its forward position embraces between two beveled bifurcations at its front end the slide 204, the beveled bifurcations upon the slide 294 being adapted to coöperate with beveled shoulders upon an enlargement 296 of the slide 204, upon the upward movement of the latter slide, to bring the pin holder 202 into such position that the pins 200 and 214 will fall into the spaces between the two series of stops 190 and 192, and between the two series of stops 194 and 196, respectively. The spring 298 tends to keep the slide 294 normally in its forward position. When no shoe is pressed against the milled edge of the dial 164, the heel-engaging end of the feeler 288 will be moved, through its connection with the slide 294, beyond the forward edge of the dial. The feeler is positioned to engage the edge of the heel at a point adjacent to a portion of the surface, somewhat in advance of the portion being operated upon, and when the point of engagement is not upon a portion of the edge of the heel that recedes abruptly from the portion adjacent to the surface being operated upon, the engagement of the heel with the feeler will prevent the slide 294 from interfering with the inserting operation. When, however, the contour of the heel changes its direction abruptly, as at the square or at the rounded corners, the feeler, as one of the corners approaches the inserting mechanism, will, unless prevented by other means, be permitted to move forward and the spring-pressed slide 294 being thus released will move into position to stop the insertion of fastenings by the action of its beveled bifurcations upon the beveled shoulders of the slide 204. The distance of the point of insertion of the last fastening from the corner which determines when the insertion of fastenings shall cease depends obviously upon the distance along the edge of the heel of the point of engagement of the feeler from the point opposite the surface upon which the inserting mechanism is operating. This distance may be varied by adjusting the feeler in any suitable way. In the construction shown the feeler is attached to the rockshaft 290 by means of a clamp collar 289. The shank of the feeler is dove-tailed and passes through a dovetail opening between the clamp members of the clamp collar in which it may be adjusted to vary the position of the engaging end of the feeler.

In order that the insertion of fastenings may be continued beyond the first or even the second corner of the heel which passes the heel feeler, adjustable means has been provided to predetermine the corner of the heel from which the end of the row of fastenings is to be gaged. Said means comprises means for preventing premature action of the feeler controlled stopping means, and in the construction shown comprises a finger 300 which is adapted to bear against the segment 175 during a part of the rotation of the dial 164. The segment 175 rotates with the dial and is adjustable relatively thereto, as hereinbefore pointed out, so that the part of the rotation during which the finger 300 and the segment 175 are in contact may be varied. As the parts are positioned in Fig. 23, the feeler, owing to the combined action of the segment 175 and the straight portions of the heel, will not be permitted to move forward until it reaches the lower breast corner of the heel there shown. By turning the knurled nut 176 to bring the segment 175 into different positions relatively to the initial position of the dial, the insertion of fastenings may be stopped when the feeler arrives at either of the rounded corners of the heel.

The work is fed in this construction as in the machine of Letters Patent No. 1,012,811, above referred to, by the engagement of a member carried by the laterally swinging frame 24 with a partially inserted fastening. The fastening engaging member, which may be called the feed plate, comprises a plate 302 having an upwardly extending shank 304 slidably mounted in the back part of the cutter carrier head 40 and offset at its upper end, the offset portion lying above a part of the cutter carrier head and furnishing an abutment against which presses one end of a coil spring 306, surrounding a headed bolt 308 connected to the offset portion of the shank. The bolt 308 passes through an opening in a leaf spring 310 confined at its ends between lugs on the swinging frame 24 and against the under side of this spring the other end of the coil spring 306 presses.

In the fastening-inserting operation, the fastening strips are passed down through an opening or openings in the feed plate 302, the number and the shape of the openings depending upon the nature of the designs which the machine is equipped to insert. In the construction shown, a slot is provided in the feed plate, through any part of which the fastening may be inserted, such a construction of the feed plate being especially desirable when a design like that shown in Fig. 16 is to be produced. The feed plate 302 is lifted to permit it to pass over the partially inserted fastening, after the work has been fed, by the engagement of the cutter carrier head 40 with the offset portion of the shank 304 upon the upward movement of the head. When released by the head, the spring 306 presses the feed plate down upon the work. The feed plate is also moved positively down upon the work during the fastening-inserting movement of the cutter carrier head 40 by the engagement of a portion of the head with a rearward projection at the lower end of the shank of the feed plate to cause a solid portion of the feed plate to engage and drive flush with the surface the fastening previously partially inserted. The leaf spring 310 is provided to prevent breakage of parts should the end of a fastening strip fail to pass through the opening in the feed plate 302 and be forced against the upper side of the plate by the action of the cutters. In such case the leaf spring 310 will be bent down by the pressure of the head of the bolt 308 against its upper side, the work yielding sufficiently under the feed plate to prevent breakage. This construction is especially useful to prevent breakage when the machine is caused to form fastenings without having work in position to receive them.

It now remains to describe an important feature of a machine which is to run at high speed, namely the actuating mechanism. One of the difficulties which it is sought to overcome by the actuating mechanism here provided is that of controlling a high speed fastening-inserting machine, so that it will do neither incomplete work nor too much work. In this machine, as in the machine of Letters Patent No. 1,012,811, the work support or horn is lowered sufficiently after each fastening-inserting operation to permit the work to be fed freely thereover, and is then raised to lock the work in position to receive the fastening or fastenings. The mechanism for reciprocating the horn for this purpose comprises a lever 312, fulcrumed on a pin 314 in the head of the machine and having a roll 316 that travels in a cam groove 318 in the face of the pulley 16. The lever 312 oscillates continuously while the main shaft rotates. Fulcrumed on the pin 314 and straddling the lever 312 is a bifurcated lever 320 connected by a rod 322 with one end of a lever 324 in the base of the machine. The horn H is connected to the other end of the lever 324 by means of a rod 326 upon which is carried a counterbalancing weight 328. A spring 330, confined between a collar 332 on the horn shaft and a boss upon the machine base, is designed to accelerate the downward movements of the horn. The bifurcated lever 320 is provided with a curved surface concentric with the fulcrum pin 314 and between said curved surface and a straight face 334 on the lever 312 a roller 336 is adapted to be interposed for locking said levers together, so that when the lever 312 moves downwardly the bifurcated lever 320 will move with it to cause the horn to clamp the stock against the foot plate 338. The construction of these levers and of their actuating means is substantially the same as in the machine in Letters Patent No. 1,012,811. The roller 336 is carried in a yoke on the end of a rod 340 mounted in a carrier 342. To the roller 336 is imparted by a spring-pressed plunger 337 a tendency to remain in the upper part of the yoke. The rod 340 is slidingly mounted in an opening in the carrier 342 and beneath its lower end of the rod a bracket 344 upon the carrier supports a spring 346 socketed in the rod and tending to keep the rod in a predetermined position upon the carrier. The position of the rod 340 with relation to the carrier 342 is determined by a nut 348 threaded upon the lower end of the rod and pressed against the carrier by the action of the spring 346. By adjusting the nut upon the rod, the position of the rod upon the carrier may be varied. The carrier 342 is mounted for vertical movement in guiding grooves in the machine head, and is provided upon its inner side with an inclined groove 350 with which engages a correspondingly inclined tongue 352, on a horizontally moving slide 354 whereby vertical movement is imparted to the carrier through horizontal movement of the slide. The slide 354 is connected at its forward end by a link 356 with one arm 358 of a three-armed lever pivoted at 360 upon the machine head. A second arm 362 of the three-armed lever is connected by a rod 364 with a block 366, pivoted upon the lever 324 near its rear end. The rod 364 is headed at its lower end and is adapted to slide freely in an opening in the block 366. A spring 368, surrounding the rod 364 and confined between the block 366 and the nut 370 upon the threaded upper part of the rod, is adapted to transmit the movements of the arm 362 to the lever 324. The third arm 372 of the three-armed lever carries at its outer end a cam roll 374, bearing against a cam 376 upon the cam disk 378. The cam disk 378 is loosely mounted on the end of the shaft 114, and is provided also with an edge cam with which coöperates a cam roll 380 carried by an arm 382 upon a rockshaft 384, journaled in the machine head. At its inner end the rockshaft carries a finger 386, adapted to bear against the rear end of the sliding bolt 238. The cam disk 378 is adapted to be connected to the shaft 114 to rotate therewith by means of a pawl 388 attached to the cam disk, and spring-pressed toward a ratchet wheel 390 attached to the shaft 114.

Means, preferably under the control of the operator, is provided for effecting the engagement and disengagement of the pawl 388 and the ratchet wheel 390. As shown, said means comprises a lever 392 pivoted at 360 and having a hook-shaped arm partially encircling the shaft 114. A pin 394 projecting from the machine head between two lugs upon the hook-shaped arm limits the amount of movement of the lever 392. The other arm of the lever 392 is connected by a rod 396 to the rear end of a treadle 398, pivoted in the base of the machine. The forward end of the treadle, which is adapted to be operated by the foot of the operator, is kept normally raised by a spring 400. Upon the inner side of the hook of the hook-shaped end of the lever 392 are two knobs 402 and 404, located upon nearly diametrically opposite sides of the shaft 114. When the treadle 398 is in its normal raised position, the knob 402 on the hook-shaped end of the lever 392 is in position to engage the tail of the pawl 388 and move it out of engagement with the ratchet wheel 390 thereby causing the disk 378 to stop with the parts in the position shown in Fig. 2. In this position of the treadle, the knob 404 lies outside the path of the tail of the pawl 388. When the treadle 398 is depressed, the lever 392 is turned to move the knob 402 outside the path of the tail of the pawl 388 and to bring the knob 404 into the said path. In this position of the lever 392, the pawl 388 will be released and will be forced by its spring into engagement with the ratchet wheel 390, thus causing the disk 378 to turn with the shaft 114 until the tail of the pawl 388 strikes the knob 404 and is moved thereby out of engagement with the ratchet wheel 390 which will occur after about 170° of rotation of the disk 378. Should the treadle be released and permitted to rise again before the pawl 388 reaches the knob 404, the knob will be moved out of the path of the tail of the pawl, and the pawl will not be moved out of engagement with the ratchet wheel until it again reaches the knob 402 after a complete rotation of the disk 378. When the cam disk 378 is in the position shown in Fig. 2, the cam roll 380 is in engagement with the higher portion of the edge cam and the rockshaft 384 is rocked to cause the finger 386 to press forward the sliding bolt 238, thus locking together by means of the pawl 242 the slides 96 and 66 and preventing the formation of fastenings. In this position of the cam disk 378, the cam roll 374 upon the arm 372 of the three-armed lever is in engagement with the lowest portion of the cam 376 and the lever is turned to bring the slide 354, controlled by the arm 358, into its rearmost position and to bring the horn H, controlled by the arm 362, into its work-receiving position. In this position of the slide 354 the carrier 342 is lowered, and the roller 336 is moved out of operative position between the levers 312 and 320. As has been hereinbefore pointed out, the speed ratio of the shaft 114, to which the ratchet wheel 390 is connected, to the main shaft 14, is as one to six, so that if the connection between the pawl 388 and the ratchet wheel 390 be maintained, the cam disk 378 will make one complete rotation for six rotations of the main shaft 14. The ratchet teeth of the ratchet wheel 390 are so located about the shaft 114 that the cam disk 378, when connected by its pawl 388 to the ratchet wheel 390, will begin to rotate approximately when the cutter carrier head 40 begins to descend from the highest point in its reciprocatory movement. The edge cam upon the cam disk 378 is so shaped that its lower part will be brought under the cam roll 380 during the first half of the third rotation of the main shaft 14 after the connection between the cam disk and the ratchet wheel 390 has been made. The movement of the roll 380 down upon the lower part of the edge cam permits the sliding bolt 238 to be pushed back to release the pawl 242. The sliding bolt will be pushed back, however, only when the spring-pressed plunger 232 is in the notch upon the upper side of the pivotal axis of the actuating lever 234, which obviously will depend upon the position of the pin 200 upon the dial 164. The pawl 242 will not move out of engagement with the ledge 244 until both the slide 66 and the slide 96 have reached, or nearly reached, their lowermost positions, at the end of the downward movement of the cutter carrier head 40, when there will be a space of about 1/64 of an inch between the lower edge of the pawl and the ledge, and the pawl will be free to move back out of line with the ledge under the influence of its spring, provided the sliding bolt 238 has been moved back. If at the end of the first half of the third rotation of the main shaft 14, after the cam disk 378 has begun to rotate with the shaft 114, the sliding bolt 238 has been moved back so that the connection between the slides 66 and 96 is broken during the last half of the third rotation of the main shaft, the cutters will move relatively to the retainer 80 and the fastening strips, and during the first half of the fourth rotation of the main shaft they will grip one or more strips according to the position of the fastening presenter 117 and partially insert and sever one or more fastenings. The horn-raising cam 376 is so shaped that the horn is raised to clamp the work in position to receive a fastening, and the slide 354 is moved forward to cause the roller 336 to be raised into locking position between the levers 312 and 320 of the horn-reciprocating mechanism during the rotations of the main shaft, counted from the starting of the cam disk 378 preceding that in which the first fastening is inserted. If the operator, after depressing the treadle to effect a connection between the cam disk 378 and ratchet wheel 390, keeps the treadle in its depressed position at the end of the third rotation of the main shaft 14, the disk 378 will have been rotated to bring the tail of the pawl 388 into engagement with the knob 404 and the pawl will be moved out of engagement with the ratchet wheel 390, thus causing the disk 378 to be stopped with the cam roll 380 upon the lower part of the edge cam, and the cam roll 374 upon the higher part of the horn-raising cam 376, a depression 377 being provided for the roll 374 in this part of the cam 376, the depression aiding in stopping the cam disk 376 in this position. In this position of the cam disk 378 a fastening will be inserted during the succeeding or fourth rotation of the main shaft and during each succeeding rotation thereafter so long as the treadle is depressed, provided the sliding bolt 238 is maintained in its rearmost position. When the treadle is released after having been held in its depressed position during several fastening-inserting operations, the pawl 388 is again permitted to engage the ratchet wheel 390 and the cam disk 378 again rotates with the shaft 114. As above stated, the cam disk will begin to rotate with the downward movement of the cutter carrier head 40. The edge cam upon the cam disk is so shaped that during a part of this first half rotation of the main shaft, following the restoration of the connection between the cam disk and the ratchet wheel 390, the rockshaft 384 will be rocked slightly to cause the finger 386 to press forward the sliding bolt 238 and bring the pawl 242 close to the vertical line through the edge of the ledge 244. When the cutter carrier head 40 and the retainer 80 reach the point in their downward movement at which the ledge 244 upon the slide 66 begins to move below the pawl 242 the roll 380 will ride upon a portion of the curve between the lower portion and upper portion of the edge cam which is more abrupt and the rockshaft 384 will be rocked quickly to cause the finger 386 to push forward the sliding bolt 238 and move the pawl 242 over the ledge 244, thus locking together the slides 66 and 96. Since the slides 66 and 96 are not locked together until near the end of this half rotation, a fastening will be partially inserted. During the next rotation of the main shaft, after the one in which the cam disk has been connected to the ratchet wheel 390 by the release of the treadle, no fastening will be inserted, but the horn will be clamped against the foot plate and a solid portion of the feed plate will engage the previously partially inserted fastening and drive it flush with the surface of the work. During the succeeding or third rotation of the main shaft, the horn will be released and will drop into work-receiving position, the tail of the pawl will strike the knob 402 and the rotation of the cam disk 378 will be stopped.

The manner in which the different parts of the machine operate has been described to some extent in connection with the description of the construction of these parts. The operation of the machine as a whole may be briefly described as follows: The machine is made ready for use by shifting the belt from the loose pulley 18 to the fast pulley 16, whereby the main shaft 14 is set in motion. This shaft, together with all of the mechanisms normally connected with it and all of those normally connected with the shaft 114, is continuously actuated while the machine is in use. The parts being in the position shown in Fig. 2, the operator presses the top lift of the heel of a shoe against the foot plate 338 with the edge of the top lift bearing against the milled edge of the dial 164 and with the sole of the shoe extending toward his left hand. The part of the top lift near the breast corner nearest the machine being under the inserting mechanism, the heel feeler 288 will be engaged by the edge of the top lift and will be moved inward sufficiently to force the spring-pressed slide 204 out of coöperative relation to the slide bar 204, thus permitting the slide bar 204 to be moved either to the right or to the left to position the pins 200 and 214 over the series of stops 192 and 196, respectively, or over the series 190 and 194, respectively. If the shoe be a right shoe, the sole will engage the sole feeler 276 and move the pins 200 and 214 into a position over the series of stops 190 and 194, respectively. If it be a left shoe, the sole will rest in front of the sole feeler 276 until the treadle is depressed, when the feeler will be moved forward by the arm 358 of the three-armed lever until it contacts with the edge of the sole and the pins 200 and 214 will be moved into position over the series of stops 192 and 196, respectively. Assuming that the shoe is a right shoe and that a stop in the series 190 is under the pin 200, the pawl 248 will then engage the lower notch 252 in the slide bar 204 and will lift the slide bar sufficiently to cause the lower lug 226 to engage the pin 228 upon the plunger casing 230 and push the spring-pressed plunger 232 into the notch upon the upper side of the pivotal axis of the actuating lever 234 for the sliding bolt 238. The spring-pressed plunger 232 in this position imparts to the sliding bolt 238 a tendency to move backward and release the pawl 242. The sliding bolt is, however, held in its forward position by the finger 386 upon the rockshaft 384. If now the treadle be depressed, the lever 392 will be rocked to move the knob 402 out of the path of the tail of the pawl 388 and to move the knob 404 into the said path, and the pawl thus released will engage a tooth of the ratchet wheel 390, thereby connecting the cam disk 378 to the shaft 114. As the cam disk 378 begins to rotate, the three-armed lever will be rocked by the action of the cam 376 on the cam roll 374, the arm 358 will move forward, pulling forward the slide 354 and, raising the carrier 342 and the arm 362, move downward causing the horn to move upward. When the cutter carrier head 40 begins to move down during the first half of the third rotation of the main shaft following the engagement of the ratchet wheel 390 by the pawl 388, the three-armed lever has been rocked sufficiently to raise the horn into operative position and to cause the roller 336 to be raised into locking position between the levers 312 and 320. During this half of the third rotation of the main shaft, the cam roll 380 rides down upon the lower part of the edge cam upon the cam disk 378, and the finger 386 and sliding bolt 238 are forced back by the action of the spring-pressed plunger 232. Near the end of the first half of the third rotation of the main shaft the pawl 242 moves out of engagement with the ledge 244 and the slides 66 and 96 are free to move relatively to each other upon their upward movement during the last half of this rotation, thereby permitting the cutters to move relatively to the fastening strips held in the retainer 80. Near the end of the third rotation of the main shaft, or after about 170° of the rotation of the cam disk 378, the tail of the pawl 388 strikes the knob 404, the pawl is moved out of engagement with the ratchet wheel 390, the roll 374 drops into the depression 377 on the cam 376 and the cam disk stops rotating. Assuming that a stop in the series 194 is under the pin 214, thereby causing the cam slide 154 to be pushed into position to raise the dog 138 into engagement with the shoulder 142 on the rack-toothed bar 130 and to permit the dog 140 to fall into its lowermost position, then, at the end of the third rotation of the main shaft above specified, all of the parts illustrated in Fig. 5 will be in the position there shown. During the first half of the fourth rotation of the main shaft the cutters, which are actuated at each rotation of the said shaft, will grip the strip $w$ which now lies between them, and to which they have moved relatively a distance equal to the desired fastening length during the last half of the third rotation, and will partially insert and sever a fastening from this strip. While the pins 200 and 214 engage simultaneously stops in the series 190 and 194 respectively, a fastening formed from the strip $w$ will be partially inserted at each rotation of the main shaft after the fourth. When the pin 200 drops into a space in the series 190 no fastening will be inserted and when the pin 214 drops into a space in the series 194 fastenings from the strips $x$ and $y$ will be inserted simultaneously provided the pin 200 at this time engages a stop in the series 190. After the fastening has been partially inserted during the first half of the fourth rotation of the main shaft, as shown in Fig. 29, near the end of this half rotation the fastening is severed by the cutters, the levers 312 and 320 start upward to release the work and during the first part of the last half of this rotation the frame 24 swings to the left with the feed plate 302 and the work is fed by the engagement of the feed plate with the partially inserted fastening. The cutters and feed plate then rise, as shown in Fig. 30, and move to the right so that when they start down again at the beginning of the fifth rotation of the main shaft, as shown in Fig. 31, to partially insert the next fastening a solid portion of the feed plate 302 will be above the previously partially inserted fastening, and will engage and drive it flush with the work as the cutter carrier head descends, as shown in Fig. 32. At each succeeding fastening-inserting operation, the previously partially inserted fastening will be driven flush with the surface of the work in the same way. If the row of fastenings is to run along the edge of the heel to a point adjacent to the opposite breast corner, as, for example, on the top lift shown in Fig. 24, the segment 175 is turned to the position shown in Fig. 23, in which position it is engaged by the finger 300 as the row of fastenings approaches the rounded corners of the heel. As the dial is rotated by the movement of the heel, the segment 175 is rotated with it until, when the row of fastenings approaches the opposite breast corner of the heel, the finger 300 drops off the straight edge of the segment and the feeler 288 is free to move forward when it reaches the breast edge, thus permitting the slide 294 to be pushed over the beveled shoulders on the slide bar 204 and stop the insertion of fastenings. When several stops in succession are omitted from the series coöperating with pin 200, the work is fed by hand between successive work-clamping movements of the horn, since there will be no partially inserted fastening to be engaged by the feed plate 302 when this part of the dial comes under the pin 200. By roughening the under side of the feed plate, such feeding of the work might be effected automatically but since no fastening can be inserted until a certain amount of fastening-receiving surface of the work has passed the inserting mechanism to cause the dial to be rotated to bring another stop under the pin 200, it is immaterial, so far as the spacing of the fastenings is concerned, how the work is fed when the insertion of fastenings is interrupted and it is, therefore, preferably fed by hand, since in this way no mark is left upon the work. If the treadle be released while the inserting mechanism is still operating to insert fastenings, the pawl 388 will be released by the knob 404 and will engage the ratchet wheel 300 to cause the cam disk 378 to begin to rotate with the shaft 114 as the cutter carrier head 40 begins to descend. During this half rotation of the main shaft 14 a fastening will be partially inserted and the previously partially inserted fastening will be driven flush with the surface of the work. Near the end of this first half rotation following the engagement of the ratchet wheel 390 by the pawl 388, the roll 380 will ride upon the upper part of the edge cam on the cam disk 378 and the pawl 242 will be pushed over the ledge 244 by the action of the finger 386 and the sliding bolt 238, and the slides 66 and 96 will be locked together. During the last half of this rotation there will be no relative fastening-measuring movement of the cutters and the retainer 80, but the feed plate 302 will engage the fastening inserted during the first half of this rotation and feed the work as usual. As the cutter carrier head descends in the first half of the next rotation of the main shaft, no fastening will be partially inserted but the feed plate 302 will engage the previously partially inserted fastening and drive it flush with the surface of the work, the horn being still maintained in its raised position, and during the next or third rotation of the main shaft following the engagement of the ratchet wheel 390 by pawl 388, the cam roll 374 will arrive at the lowest point upon the cam 376, the three-armed lever will be rocked to unlock the levers 312 and 320 and to drop the horn so that the work may be removed and the tail of the pawl 388 will strike the knob 402 and cause the pawl to be disengaged from the ratchet wheel 390 thus stopping the cam disk 378.

It will be noted that three rotations of the main shaft are required to place all the parts in position for the insertion of fastenings, and that three rotations are required to restore the parts to their inoperative positions, the actuating mechanism being so constructed that the last partially inserted fastening is completely inserted before the horn is dropped. It will therefore be seen that to insert a single fastening completely by depressing the treadle and then releasing it before the disk 378 has rotated to bring the pawl 388 against the knob 404 will require six rotations of the main shaft. It has been found in practice that three rotations of the main shaft are sufficient, within practical speed limits, to afford the operator time enough to remove his foot after depressing the treadle for the insertion of a single fastening. By a mere mechanical modification of the parts to suit them to a different speed ratio between the shafts 114 and 14, the number of rotations required to put the parts in operative position may obviously be varied.

It is, of course, obvious that this invention is not limited to the provision in a single machine of all the novel features of construction and operation herein disclosed and many of which have been pointed out above. For example, the machine can be constructed to operate at high speed by selecting only those novel features of the invention which have this end in view. Although the provision of automatic design mechanism is preferable in a machine which is to operate at high speed, it is not essential to the rapid insertion of fastenings in designs of a nature not too complex. Furthermore, the design mechanisms, the starting and stopping mechanism, the automatic stopping mechanism and other novel features are each useful independently of the others, or with different combinations of the others, and in machines for inserting fastenings which are constructed to attain ends other than those of speed, or other ends besides those of speed. Rearranged combinations and mechanical modifications and changes in parts not amounting to invention are considered, as usual, to come within the scope of the appended claims and the terms of the claims should be construed in the broadest sense consistent with the state of the art at the time this invention was made. In this connection it is to be noted that when the insertion of fastenings is stopped by the action of the automatic stopping mechanism, this action taking place while the operator still maintains his foot on the treadle, the horn will not be dropped until the operator releases the treadle. It will therefore be seen that an important and novel feature of the invention is the provision in a machine of the class described of stopping mechanism operable independently of the treadle through which the inserting mechanism has been rendered operative to insert fastenings and means for maintaining the work support in operative relation to the inserting mechanism after the actuation of the stopping mechanism until the treadle has been released.

In the co-pending application of Louis A. Casgrain Serial No. 452,755, filed September 12, 1908, for Letters Patent for improvements in machines for inserting fastenings is shown and described an improved machine for inserting fastenings which embodies much of the subject-matter disclosed in the present application. Claims to the subject-matter common to this application and the said co-pending application have been made in said co-pending application.

Having described my invention, what I claim as new and desire to secure by Letters Patent of the United States is:—

1. In a machine for inserting fastenings, the combination with fastening-inserting mechanism and a plurality of sources of fastening supply, of means for causing different selections of fastenings from said sources of supply to be presented to the inserting mechanism at different operations thereof, and means for automatically suspending the insertion of fastenings while predetermined portions of the fastening-receiving surface of the work pass the inserting mechanism, provision being made for the successive insertion of fastenings from different sources of supply in the same row.

2. In a machine for inserting fastenings, the combination with a plurality of sources of fastening supply, of fastening-inserting mechanism capable of inserting fastenings simultaneously in a plurality of rows, means for controlling the kinds and the number of fastenings to be inserted in each row while the inserting mechanism is operative to insert fastenings constructed to provide for the insertion of different kinds of fastenings in the same row, and means for causing the insertion of fastenings to be automatically interrupted after a predetermined number have been inserted and for causing the insertion of fastenings to be automatically resumed after a predetermined portion of the fastening receiving surface of the work has passed under the inserting mechanism.

3. In a machine for inserting fastenings, the combination with a source of fastening supply and means for inserting fastenings simultaneously in a plurality of rows, of automatic means for interrupting the insertion of fastenings in one of the rows during a predetermined number of inserting operations of the inserting mechanism in another row, and means governed by the movement of the work for causing the insertion of fastenings to be altogether suspended while predetermined portions of the fastening-receiving surface of the work are passing under the inserting mechanism.

4. In a machine for inserting fastenings, the combination with means for inserting fastenings in a plurality of rows and means for feeding the work by engagement with a fastening, of design mechanism comprising means for interrupting the insertion of fastenings in each of the rows, means for interrupting the insertion of fastenings in all of the rows simultaneously, means for insuring like spacing of successive designs in those parts in which the insertion of fastenings is not completely interrupted, and means for insuring in successive designs like spacing in those parts in which the insertion of fastenings is completely interrupted.

5. In a fastening-inserting machine, the combination with means for seizing, partially driving and severing a portion at the end of a continuous fastening strip to form a fastening, of means to hold said strip against return movement with said first-named means, to permit relative movement of said first-named means and said strip, and automatic means for locking said holding means and said first-named means together to prevent relative movement of said strip and said first-named means when no fastening is to be formed.

6. In a fastening-inserting machine, the combination with a plurality of sources of fastening-supply and fastening-inserting mechanism, of means for presenting selections of fastenings to said inserting mechanism from said sources of supply in predetermined order during a series of operations of the inserting mechanism, means for interrupting the insertion of fastenings and a controlling dial having a portion constructed and arranged to control the action of said presenting means to cause the predetermined order in which the selections of fastenings are presented to the inserting mechanism to be different in different series of operations of the inserting mechanism, and having another portion constructed and arranged to control the action of said interrupting means to cause the spacing of the inserted fastenings to follow a predetermined design.

7. In a machine for inserting fastenings, the combination with means for inserting fastenings simultaneously in a plurality of rows, of automatic means for varying the spacing of the fastenings in each row by interrupting the insertion of fastenings in any number of rows less than the whole number, and automatic means for varying the spacing of the fastenings in each row by interrupting simultaneously the insertion of fastenings in all of the rows.

8. In a machine for inserting fastenings, the combination with means for inserting fastenings, of means controlled by the movement of the work for interrupting the insertion of fastenings while predetermined portions of the fastening-receiving surface of the work are passing the inserting mechanism, and for causing the insertion of fastenings to be resumed after the said portions of the work have passed.

9. In a machine for inserting fastenings, the combination with fastening-inserting mechanism constructed to partially insert a fastening at each operation, means for feeding the work by engagement with a partially inserted fastening, and means coöperating with the work for automatically suspending the insertion of fastenings, said means being so constructed and arranged as to prevent the resumption of the insertion of fastenings until a predetermined portion of the fastening-receiving surface of the work has been moved past the inserting mechanism.

10. In a machine of the class described, fastening-inserting mechanism, a plurality of sources of fastening supply, automatic means for causing different selections of fastenings from said sources to be presented normally to the inserting mechanism successively and automatic means for varying the normal operation of said first-named automatic means.

11. In a machine of the class described, fastening-inserting mechanism, a plurality of sources of fastening supply, automatic means for causing different selections of fastenings from said sources to be presented normally to the inserting mechanism during different cycles of operation, and automatic means for varying the normal operation of said first-named automatic means.

12. In a machine of the class described, fastening-inserting mechanism, a plurality of sources of fastening supply, automatic means for causing fastenings from said sources to be presented normally to the inserting mechanism in a pre-arranged order, and automatic means for varying the normal operation of said first-named automatic means.

13. In a machine of the class described, fastening-inserting mechanism, a plurality of sources of fastening supply, automatic means for causing selections of fastenings to be presented to the inserting mechanism first from one source of supply and then from another, and automatic means for limiting the operation to a single selection.

14. In a machine of the class described, fastening-inserting mechanism, a plurality of sources of fastening supply, a movable fastening presenter, automatic actuating means for said presenter constructed to cause fastenings to be presented from said sources to the inserting mechanism in a pre-arranged order, and automatic means for causing said presenter to be retained in a predetermined position while the actuating means continues in operation.

15. In a machine of the class described, fastening-inserting mechanism, a plurality of sources of fastening supply each provided with a different kind of fastening, automatic means for causing one kind of fastening and thereafter another kind of fastening to be presented for insertion in the same row, and automatic means for discontinuing the presentation of one of said kinds of fastenings.

16. In a machine for inserting fastenings the combination with fastening-inserting mechanism and a plurality of sources of fastening supply, of means for causing fastenings to be presented to the inserting mechanism from said sources of supply in predetermined order during a series of operations of the inserting mechanism, and means acting through said first-named means for automatically providing a different predetermined order in which the fastenings are to be presented to the inserting mechanism during a succeeding series of operations of said inserting mechanism.

17. In a machine for inserting fastenings, the combination with a single fastening-inserting mechanism and a plurality of sources of fastening supply, of a fastening presenter and mechanism for controlling the action of said presenter to cause fastenings to be presented to the inserting mechanism in predetermined order, and means for controlling the action of said controlling mechanism constructed to cause the predetermined order in which the fastenings are to be inserted to be varied automatically at predetermined times in the operation of the inserting mechanism.

18. In a machine for inserting fastenings, the combination with fastening-inserting mechanism and a plurality of sources of fastening supply, of means for causing selections of fasterings from said sources of supply to be presented to said inserting mechanism for insertion in a number of rows in predetermined order during a series of operations of the inserting mechanism, and means acting through said first-named means for automatically causing selections of fastenings to be presented to the inserting mechanism for insertion in a different number of rows during a succeeding series of operations of the inserting mechanism.

19. In a machine for inserting fastenings, the combination with fastening-inserting mechanism, of design controlling means provided with a plurality of design lay-outs, and means for effecting a design selecting adjustment of the design controlling means.

20. In a machine for inserting fastenings, the combination with fastening-inserting mechanism, of design controlling means provided with a plurality of design lay-outs, and automatic means for effecting a design selecting adjustment of the design controlling means.

21. In a machine for inserting fastenings, the combination with fastening-inserting mechanism, of design controlling means provided with a design lay-out adapted to furnish a design suited to the right shoe of a pair and with another design lay-out adapted to furnish a design suited to the left shoe of a pair, and means for effecting a design selecting adjustment of the design controlling means.

22. In a machine for inserting fastenings, the combination with fastening-inserting mechanism, of design controlling means provided with a design lay-out adapted to furnish a design having its characteristic features arranged in a predetermined order and provided with another design lay-out adapted to furnish a design having the characteristic features of the first design arranged in reverse order, and means for effecting a design selecting adjustment of the design controlling means.

23. In a machine for inserting fastenings, the combination with fastening-inserting mechanism and a plurality of sources of fastenings supply; of means for varying the selective relationship between said inserting mechanism and said sources of supply in accordance with a predetermined design, and means for automatically suiting the design to the work to be operated upon.

24. In a machine for inserting fastenings, the combination with fastening-inserting mechanism, a source of fastening supply and means for controlling the design according to which the fastenings are to be inserted, of means controlled by the work to be operated upon for causing the design-controlling means to suit the design to the characteristics of the work.

25. In a machine for inserting fastenings, the combination with fastening-inserting mechanism, a source of fastening supply and controlling means for causing the fastenings to be inserted in a predetermined design, of automatic means for effecting a design-selecting action of the design-controlling means.

26. In a machine for inserting fastenings, the combination with fastening-inserting mechanism, a source of fastening supply and controlling means for causing fastenings to be inserted in a predetermined design, of means controlled by a characteristic of the work to be operated upon for effecting a design-selecting action of the design-controlling means.

27. In a machine for inserting fastenings, the combination with fastening-inserting mechanism, of controlling means constructed and arranged to be placed in any one of a plurality of relations to the inserting mechanism whereby it may cause the inserting mechanism to insert fastenings in any one of a plurality of predetermined designs and means governed by a characteristic of the work to be operated upon for placing the controlling means in such relation to the inserting mechanism that it will cause the inserting mechanism to insert fastenings in the design intended for work having that particular characteristic.

28. In a machine for inserting fastenings, the combination with fastening-inserting mechanism and a plurality of sources of fastening supply, of controlling means for causing fastenings to be presented to the inserting mechanism in predetermined order from said sources of supply, and means controlled by a characteristic of the shoe upon which the machine is operating for governing the action of said controlling means in such manner that the resultant designs of the fastenings inserted in the right and left shoes of a pair will be arranged symmetrically in the pair with respect to each other.

29. In a machine of the class described, means for severing fastenings from a strip of fastening material, automatic means for varying the lengths of the fastenings severed, and automatic means for causing the fastening strip and fastening-severing means to be placed in zero fastening-length relation to each other at predetermined times in the operation of the fastening-severing means.

30. In a machine of the class described, means for severing fastenings from a strip of fastening material, means for causing a predetermined amount of fastening-length measuring relative movement between the fastening-severing means and the strip of fastening material, and automatic means for preventing relative movement of the severing means and strip at predetermined times during the operations of the former.

31. In a machine of the class described, constantly reciprocating fastening-severing means adapted to sever fastenings from a strip of fastening material, said severing means and said strip being movable relatively to each other to vary the lengths of the fastenings severed, means for predetermining the amount of each fastening-length measuring relative movement of the strip and the severing means, and means for automatically reducing the amount of said relative movement to zero at predetermined times in the operation of the machine.

32. In a machine of the class described, mechanism for inserting fastenings, means for rendering said mechanism operative to insert fastenings, other means for rendering said mechanism inoperative after the desired number of fastenings has been inserted, a work support, and means independent of said last-named means for automatically raising the work support into operative position before the first fastening is inserted.

33. In a machine of the class described, mechanism for inserting fastenings, means for rendering said mechanism operative to insert fastenings, other means for automatically rendering said mechanism inoperative after a predetermined series of fastenings has been inserted, a work support, and means independent of said last-named means for automatically raising the work support into operative position before the first fastening is inserted.

34. In a machine of the class described, fastening inserting mechanism, means under the control of the operator for rendering said mechanism operative to insert fastenings, other means for automatically rendering said mechanism inoperative after a predetermined number of fastenings has been inserted, a work support, and means, independent of said last-named means, for automatically raising the work support into operative position before the first fastening is inserted, constructed to permit the work support to be lowered at the will of the operator.

35. In a machine of the class described, mechanism for successively inserting fastenings, means for automatically rendering said mechanism inoperative, after a predetermined series of fastenings has been inserted, a work support, and means independent of said aforementioned means for automatically raising the work support into operative position before the first fastening is inserted.

36. In a machine of the class described, mechanism for successively inserting fastenings, means for automatically rendering said mechanism inoperative after a predetermined number of fastenings has been inserted, a work support, and means, independent of said aforementioned means, for automatically raising the work support into operative position before the first fastening is inserted, constructed to permit the work support to be lowered at the will of the operator.

37. In a machine of the class described, mechanism for inserting fastenings, means under the control of the operator for rendering said mechanism operative, means for automatically rendering said mechanism inoperative when the work has been brought into a predetermined relation thereto, said last-mentioned means being independent of the first-mentioned means and being arranged to be moved from operative to inoperative position by the presentation of the work to the machine in advance of the actuation of the first-mentioned means.

38. In a machine for inserting fastenings, the combination with fastening-inserting mechanism and a source of fastening supply, of automatic means governed by the contour of the work for causing the insertion of fastenings to be discontinued at a predetermined distance from the end of the work and means for preventing premature action of said automatic means.

39. In a machine for inserting fastenings, the combination with fastening-inserting mechanism and a source of fastening supply, of automatic means governed by the contour of the work for causing the insertion of fastenings to be discontinued at a predetermined distance from the end of the work and adjustable means for preventing premature action of said automatic means.

40. In a machine for inserting fastenings, the combination with inserting mechanism, a driving shaft, a work support, power operated positioning means actuated by the driving shaft to raise the work support and position the work, means for stopping the insertion of fastenings operable independently of the positioning means and treadle controlled means independent of said stopping means to effect final depression of the work support at the will of the operator.

41. A machine for inserting fastenings, comprising in combination, a driving shaft, fastening inserting mechanism operatively connected with the driving shaft, a work support, means operated from the driving shaft for raising the work support into operative relation to the inserting mechanism, means comprising a treadle for actuating said work support raising means and for rendering said inserting mechanism operative to insert fastenings and means independent of said treadle for automatically rendering said inserting mechanism inoperative, said work support being maintained in operative relation to said inserting mechanism until the said treadle is released.

42. A machine for inserting fastenings, comprising in combination, fastening inserting mechanism, a work support, power operated means for raising the work support to position the work with relation to the fastening inserting mechanism, means comprising a treadle for actuating said work support raising means and for rendering said inserting mechanism operative to insert fastenings, means independent of the treadle for automatically stopping the insertion of fastenings, said means and mechanism being so constructed and arranged that the work support is maintained in operative relation to the inserting mechanism until the treadle is released.

43. In a fastening inserting machine, the combination with a driving shaft, fastening inserting means in operative relation thereto, a vertically movable horn or work support, means operated from the driving shaft for periodically depressing said horn to permit feeding of the work, means also operated from the driving shaft to raise the horn or work support to position the work for the action of the fastening inserting means as said means is rendered operative to insert fastenings, stopping mechanism for rendering the fastening inserting means inoperative and a treadle for manually controlling the final depression of the horn independent of the action of said stopping mechanism.

44. In a fastening inserting machine, the combination of a driving shaft, fastening inserting means in operative relation thereto, a horn or work support, a treadle, means actuated by the treadle for rendering the inserting means operative to insert fastenings, means operated from the driving shaft for periodically operating the horn or work support to permit the feeding of the work, power operated means for raising the horn or work support to position the work for the action of the fastening inserting means as said means is rendered operative to insert fastenings, and stopping mechanism acting independently of said treadle for stopping the insertion of fastenings, said parts being so constructed and arranged that the final depression of the horn is controlled by said treadle.

45. In a fastening inserting machine, the combination of a driving shaft, fastening inserting means in operative relation thereto, a horn or work support movable up and down, a cam, connections between said cam and horn or work support operated by said cam to automatically raise said horn or work support when the machine is rendered operative to insert fastenings, mechanism for stopping the insertion of fastenings and a treadle for manually controlling the final depression of the horn independent of the stopping mechanism.

46. A machine for inserting fastenings, comprising in combination, a driving shaft, fastening inserting mechanism operatively connected to said driving shaft, a work support, means operated from the driving shaft for raising the work support to position the work, mechanism operated from the driving shaft for periodically depressing the work support for feeding, means comprising a treadle for rendering the inserting mechanism operative to insert fastenings, means independent of the treadle for automatically rendering said mechanism inoperative, said means and mechanism being so constructed and organized that the work support remains in operative position after the inserting mechanism has been automatically rendered inoperative until the treadle is released.

47. In a machine of the class described, mechanism for successively inserting fastenings, power driven means for operating said mechanism, a work support, a cam arranged to be operated from said power driven means for automatically raising the work support into operative position before the first fastening is inserted, and by such operation to be entirely disconnected from said power driven means, and connections between said cam and said work support comprising a cam roll arranged to engage said cam, said cam being provided with a depression so arranged that said cam roll rests therein when said cam has completed its work support raising movement.

48. In a machine of the class described, a work support movable between a work receiving position and a work supporting position, a rotary power operated cam for effecting such movement, provision being made for complete disconnection of said cam from said power operated means when said movement is completed, and connections between said cam and said work support comprising a cam roll, said cam being provided with a recess in which said cam roll rests when the cam has completed the movement of the work support into work supporting position.

In testimony whereof I have signed my name to this specification in the presence of two subscribing witnesses.

LOUIS A. CASGRAIN.

Witnesses:
H. DORSEY SPENCER,
ARTHUR L. RUSSELL.

Copies of this patent may be obtained for five cents each, by addressing the "Commissioner of Patents, Washington, D. C."